(12) United States Patent
Livesay et al.

(10) Patent No.: US 11,940,341 B2
(45) Date of Patent: Mar. 26, 2024

(54) METHOD AND SYSTEM FOR PERFORMING NEGATIVE PRESSURE TESTS

(71) Applicant: Hecate Software, Inc., Richland, WA (US)

(72) Inventors: Ronald B. Livesay, Richland, WA (US); Eric A. Livesay, Richland, WA (US)

(73) Assignee: HECATE SOFTWARE INC., Richland, WA (US)

( * ) Notice: Subject to any disclaimer, the term of this patent is extended or adjusted under 35 U.S.C. 154(b) by 0 days.

(21) Appl. No.: 17/864,275

(22) Filed: Jul. 13, 2022

(65) Prior Publication Data

US 2023/0015393 A1    Jan. 19, 2023

Related U.S. Application Data

(60) Provisional application No. 63/221,302, filed on Jul. 13, 2021.

(51) Int. Cl.
*G01L 19/08* (2006.01)
*G01L 27/02* (2006.01)

(52) U.S. Cl.
CPC ............ *G01L 19/083* (2013.01); *G01L 27/02* (2013.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/065; G01L 9/12; G01L 19/0618; G01L 9/0052; G01L 7/16; G01L 9/125; G01L 19/0609; G01L 19/003; G01L 9/007; G01L 9/0022; G01L 19/0046; G01L 19/0627; G01L 9/06; G01L 7/084; G01L 19/0636; G01L 13/02; G01L 19/0023; G01L 19/142; G01L 7/043; G01L 19/08; G01L 9/0002; G01L 9/008; G01L 19/02; G01L 19/141; G01L 9/006; G01L 11/02; G01L 23/10; G01L 23/18;
(Continued)

(56) References Cited

FOREIGN PATENT DOCUMENTS

CN    107238461 A  * 10/2017
CN    113589857 A  * 11/2021
DE    102015116327 A1 * 3/2017

* cited by examiner

*Primary Examiner* — Andre J Allen
(74) *Attorney, Agent, or Firm* — Pillsbury Winthrop Shaw Pittman LLP

(57) ABSTRACT

Provided is a computer-implemented method for preforming negative pressure testing, also known as an inflow test. In the method, a non-transitive computer readable medium storing a pressure analysis program for analysis of pressure data is provided that when executed, causes an information processing apparatus connected to an image display screen, to receive at least one of a plurality of inputs from a user, receive a plurality of pressure values from a sensor filter at least a subset of the plurality of pressure values, select one of a plurality of negative pressure testing models; run the filtered subset of pressure values through the selected negative pressure testing model; and store the values generated by the negative pressure testing model.

20 Claims, 21 Drawing Sheets

(58) Field of Classification Search
CPC .............. G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 27/002; G01L 11/00; G01L 27/007; G01L 9/0026; G01L 19/00; G01L 9/0089; G01L 9/045; G01L 9/14; G01L 1/2281; G01L 11/025; G01L 11/008; G01L 19/0654; G01L 7/22; G01L 13/026; G01L 9/0047; G01L 13/00; G01L 9/0025; G01L 9/0076; G01L 9/0035; G01L 19/0061; G01L 9/0005; G01L 9/0019; G01L 9/08; G01L 9/10; G01L 21/00; G01L 11/006; G01L 7/08; G01L 9/0041; G01L 9/04; G01L 9/0008; G01L 19/086; G01L 1/18; G01L 11/004; G01L 19/069; G01L 9/0057; G01L 19/083; G01L 19/10; G01L 19/16; G01L 13/023; G01L 7/048; G01L 9/0016; G01L 9/00; G01L 9/0027; G01L 9/0048; G01L 9/0086; G01L 9/0079; G01L 11/04; G01L 19/06; G01L 9/0091; G01L 1/20; G01L 11/002; G01L 23/24; G01L 7/182; G01L 19/0663; G01L 7/166; G01L 1/02; G01L 23/22; G01L 27/00; G01L 9/0036; G01L 9/0061; G01L 9/0039; G01L 23/125; G01L 9/0013; G01L 19/145; G01L 9/0092; G01L 21/04; G01L 9/0045; G01L 7/104; G01L 9/0033; G01L 1/142; G01L 9/0083; G01L 9/0098; G01L 7/24; G01L 1/2293; G01L 9/0029; G01L 9/02; G01L 21/22; G01L 9/0064; G01L 7/022; G01L 1/205; G01L 5/14; G01L 23/08; G01L 23/16; G01L 7/088; G01L 7/163; G01L 9/0007; G01L 23/222; G01L 1/16; G01L 1/2287; G01L 13/06; G01L 9/0085; G01L 1/2212; G01L 9/025; G01L 21/14; G01L 9/0004; G01L 23/02; G01L 9/003; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0038; G01L 9/0032; G01L 19/0076; G01L 21/10; G01L 7/024; G01L 19/149; G01L 1/246; G01L 7/086; G01L 1/005; G01L 7/06; G01L 5/228; G01L 7/102; G01L 1/2206; G01L 13/021; G01L 27/02; G01L 1/2262; G01L 1/26; G01L 1/24; G01L 23/00; G01L 9/0094; G01L 9/0082; G01L 1/125; G01L 11/06; G01L 19/144; G01L 9/0097; G01L 1/2268; G01L 21/30; G01L 21/34; G01L 23/221; G01L 7/187; G01L 7/20; G01L 23/26; G01L 7/068; G01L 1/225; G01L 23/32; G01L 7/14; G01L 1/144; G01L 1/146; G01L 1/165; G01L 23/12; G01L 1/241; G01L 7/045; G01L 1/086; G01L 13/04; G01L 7/108; G01L 9/18; G01L 1/127; G01L 1/22; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 1/186; G01L 23/223; G01L 25/00; G01L 5/165; G01L 5/226; G01L 9/001; G01L 9/0017; G01L 1/044; G01L 3/245; G01L 1/08; G01L 21/16; G01L 3/1485; G01L 5/162; G01L 5/225; G01L 7/026; G01L 7/065; G01L 9/0014; G01L 9/005; G01L 1/04; G01L 1/242; G01L 21/24; G01L 3/10; G01L 5/0004; G01L 5/0052; G01L 1/00; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/0028; G01L 5/243; G01L 1/083; G01L 1/12; G01L 21/36; G01L 23/04; G01L 23/14; G01L 23/30; G01L 3/103; G01L 5/00; G01L 5/102; G01L 5/133; G01L 5/166; G01L 7/185; G01L 1/255; G01L 21/08; G01L 5/0033; G01L 5/0057; G01L 5/161; G01L 5/22; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/1627; G01L 5/167; G01L 5/28; G01L 1/046; G01L 23/085; G01L 23/20; G01L 5/0071; G01L 5/008; G01L 5/06; G01L 5/171; G01L 7/106
USPC ................................................ 73/700–756
See application file for complete search history.

Testing Mode

Verify Pressure Analyst Settings

Low Pressure

Negative Test Pressure Analyst

NegativeTestAnalyst Negative Test Pressure Analyst

Search

AvgApproach    None
AvgPopulationSize 1
CycleQuintessentialTest
Duration    15
EventQuintessentialTest
FailAlwaysFail
FailUnderstanding   SinceGo
LargestAcceptableFall 10
LargestAcceptableRise 20
Last Test Quin.
Logo
NegativeGracePeriod  6
PassAlwaysPass
PreasurePoints
RiseUnderstanding  SinceGo Duration Basic

High Pressure

HP Percent Drop Analyst

Mode: Custom

| Permanent Prediction | Permanent No Predication | Temporary Predication | Temporary No Predication |

Acceptable Overshoot Percent       100%
Acceptable Overshoot Pressure      1000 psi
Blackout Period                    10 s
Classification Blackout Time       5 s
Consider DPF                       ☐
Duration                           5 min
Final Max Slope                    10 psi/min
Percent Drop                       1%
Should Predict                     ☐

Data Stream (Noise Filter)

Basic

Cancel    <Back    Next>    Begin Testing

Verify Pressure Analyst Settings

Low Pressure

Negative Test Pressure Analyst

NegativeTestAnalyst Negative Test Pressure Analyst

Search

AvgApproach     None
AvgPopulationSize 1
CycleQuintessentialTest
Duration        30
EventQuintessentialTest
FailAlwaysFail  ☑
FailUnderstanding  SinceGo
LargestAcceptableFall  10
LargestAcceptableRise  10
Last Test Quin.  ☐
Logo
NegativeGracePeriod  6
PassAlwaysPass
PreasurePoints
RiseUnderstanding  SinceGo Duration Basic

High Pressure

HP Percent Drop Analyst

Mode: Custom

| | Permanent Prediction | Permanent No Predication | Temporary Predication | Temporary No Predication |
|---|---|---|---|---|
| Acceptable Overshoot Percent | | | 100% | |
| Acceptable Overshoot Pressure | | | 1000 psi | |
| Blackout Period | | | 10 s | |
| Classification Blackout Time | | | 5 s | |
| Consider DPF | | | ☐ | |
| Duration | | | 5 min | |
| Final Max Slope | | | 10 psi/min | |
| Percent Drop | | | 1% | |
| Should Predict | | | ☐ | |

Data Stream (Noise Filter)

Basic

Cancel     <Back     Next>     Begin Testing

FIG. 11

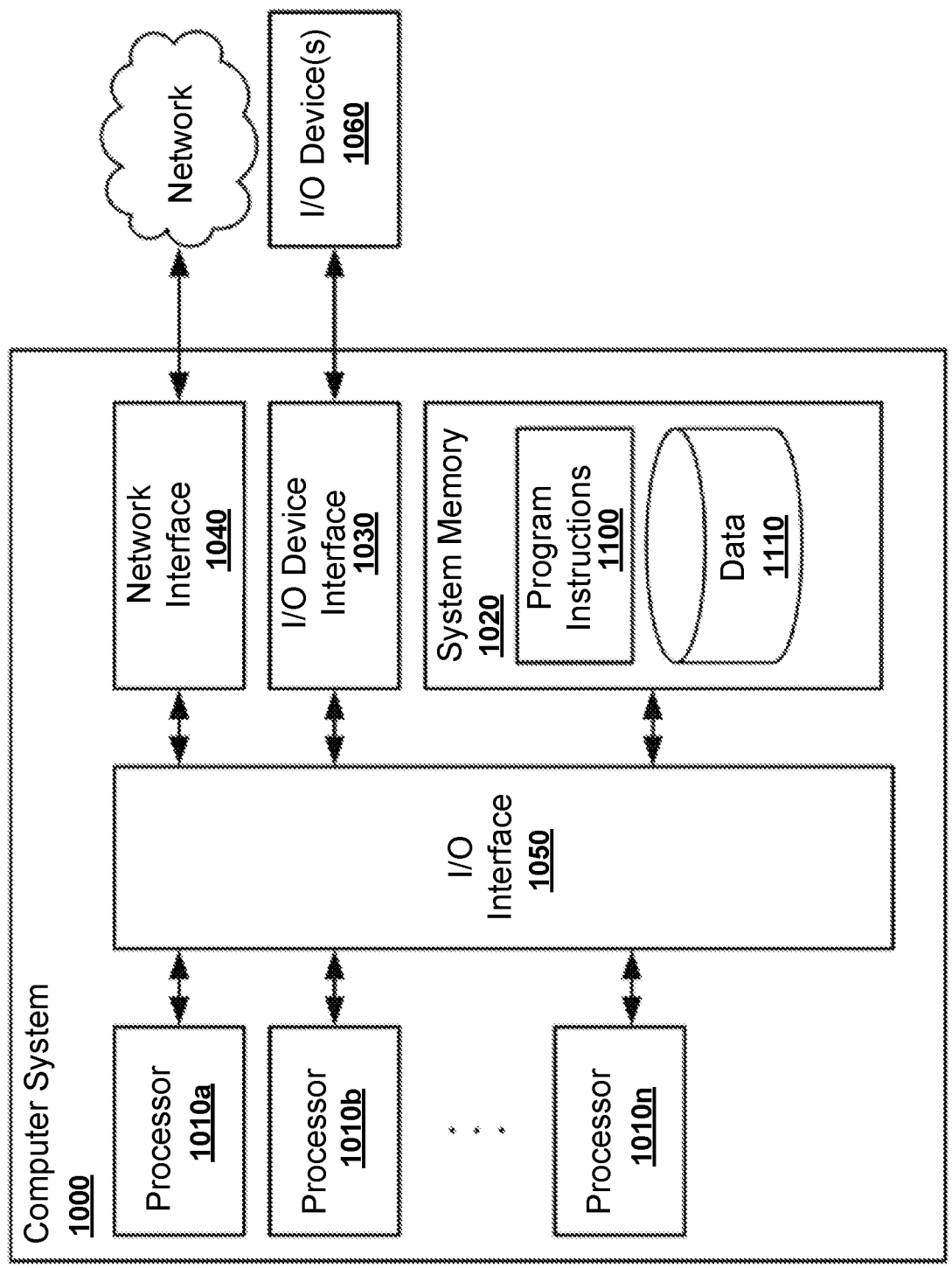

METHOD AND SYSTEM FOR PERFORMING NEGATIVE PRESSURE TESTS

CROSS-REFERENCE TO RELATED APPLICATIONS

This application claims priority to U.S. Provisional Application No. 63/221,302, filed Jul. 13, 2021, entitled METHOD AND SYSTEM FOR PERFORMING NEGATIVE PRESSURE TESTS, the entire contents of which is incorporated herein by reference in its entirety.

BACKGROUND

1. Field

The present disclosure relates generally to pressure analysis and, more particularly, to computer-implemented negative pressure tests in the oil & gas industry.

2. Description of the Related Art

In the oil and gas industry, pressurized components are ubiquitous. It is necessary to periodically monitor pressure in the pipelines and other components.

Over the years, there have been a number of methods utilized to perform pressure control and achieve digital analysis. Of particular interest here is systems and methods to preform negative pressure testing, also known as an inflow test.

SUMMARY

The following is a non-exhaustive listing of some aspects of the present techniques. These and other aspects are described in the following disclosure.

Some aspects include a set of software tools and non-transitory computer readable media that may be used for negative pressure testing, also known as an inflow test, in the oil & gas industry.

Some aspects include a tangible, non-transitory, machine-readable medium storing instructions that, when executed by a data processing apparatus cause the data processing apparatus to perform operations, including the process as mentioned above.

Some aspects include a system, including one or more processors, and memory storing instructions that, when executed by the processors, cause the processors to effectuate operations of the above-mentioned process.

It should be appreciated that the present invention can be implemented in numerous ways, including as a process, an apparatus, a system, a device, a method, or a computer-readable medium. Several inventive embodiments of the present invention are described below.

BRIEF DESCRIPTION OF THE DRAWINGS

The above-mentioned aspects and other aspects of the present techniques will be better understood when the present application is read in view of the following figure in which like numbers indicate similar or identical elements:

FIG. 9a and FIG. 9b is a second selection of test and an output embodiment of a test according to certain of the selected test.

FIG. 10a and FIG. 10b is a second selection of test and an output embodiment of a test according to certain of the selected test.

FIG. 11 is a test setting for utilization for the tests shown in FIGS. 12, 13, and 14.

FIG. 16 illustrates an example of a computing device by which the present techniques may be implemented.

Figure 1:
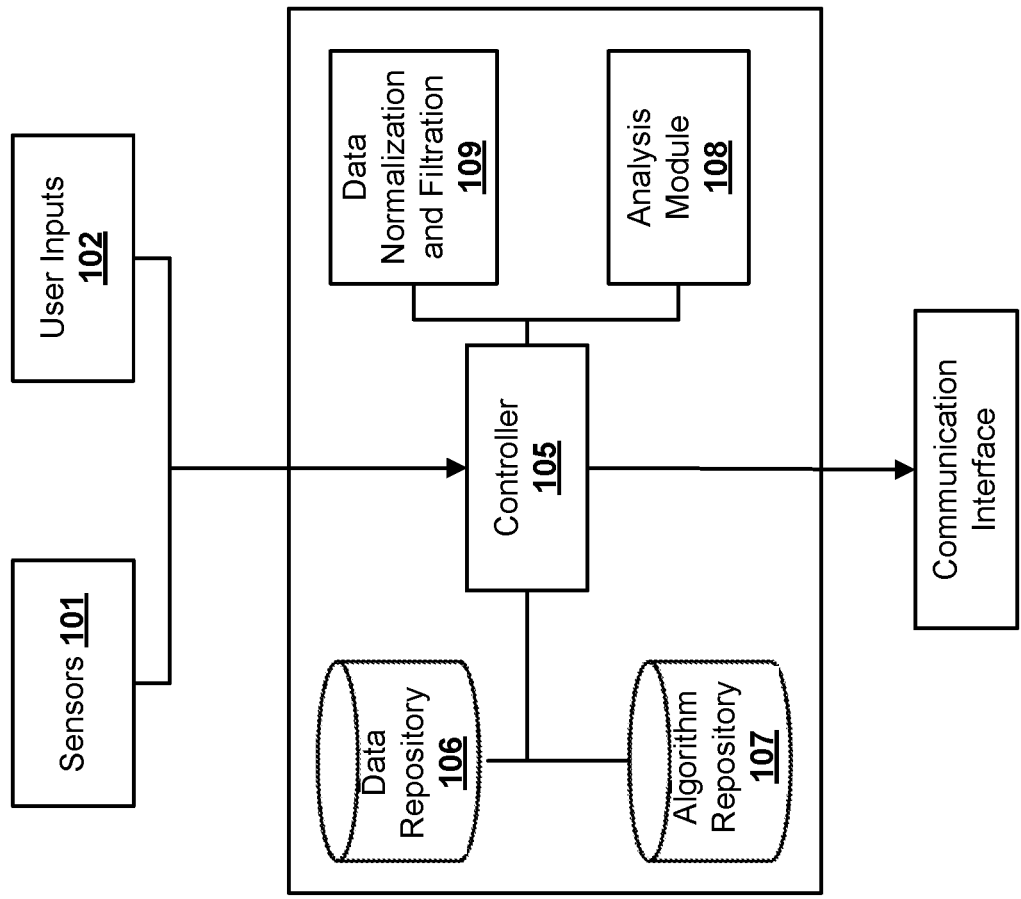
FIG. 1 is an embodiment of a system usable with the methods taught herein.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of fluid mechanics. Indeed, the inventors wish to emphasize the difficulty of negative pressure testing, also known as an inflow test, within the oil & gas industry. Further, because multiple problems are addressed, it should be understood that some embodiments are problem-specific, and not all embodiments address every problem with traditional systems described herein or provide every benefit described herein. That said, improvements that solve various permutations of these problems are described below.

In some embodiments, negative pressure testing may be performed on either an 'open' or a 'closed' system of choke manifold and blow-out preventer (BOP) components.

In some embodiments, some of the field-collected pressure data may be fed to the Negative Test Analyst and the Negative Test Analyst may be observed to operate as expected.

In some of the embodiments, a plurality of algorithms are provided that may be used to calculate the changes in the pressure that are outside the acceptable bounds in real time based on the measured pressures themselves and user-specified configuration parameters.

Examples are presented below in a technical document that describes aspects of a negative pressure testing with the present techniques. This technical document is followed by a description of a computer system upon which the present techniques may be implemented.

The methods and systems described herein are understood in view of the following embodiments exemplary of the different methods and systems within the scope of the present disclosure.

In certain embodiments, one or more of a plurality of algorithms can be utilized for performing a negative pressure test (also known as an inflow test), in accordance with some of the embodiments of this disclosure. Negative pressure tests are required on casing and liners on all wells that use a subsea blowout preventer (BOP) according to 30 CFR 250.721 (g) in effect as of the date of this application and are otherwise useful in understanding the form and integrity of BOP systems. Negative pressure tests may be performed on either an 'open' or a 'closed' system of choke manifold and blow-out preventer (BOP) components. An example of how a negative pressure test of casing cement could be performed would be to replace some of the relatively higher-weight fluid in the hole with lighter-weight fluid to such an extent that the pressure differential across the cement at the bottom of the hole is underbalanced. An underbalanced hole is one in which the hydrostatic pressure at the bottom of the hole due to the fluid in the hole is less that the pore pressure in the formation at the bottom of the hole. Some of the plurality of algorithms a.) can be deployed in a Negative Test Analyst of the software usable on blowout prevention equipment testing, such as the commercially available GreenLight™ software b.) can be integrated into the same GreenLight™ software with the results being successfully reported to the user interface of GreenLight™ (i.e., as a pass (green), a fail (red) or an inconclusive (yellow) result).

The techniques described herein, incorporated with such software as GreenLight™ provides one or more ways for the user to edit the configuration parameters of the Negative Test Analyst. Utilizing these techniques, field-collected pressure data has been fed to the Negative Test Analyst and the Negative Test Analyst has been observed to operate as expected.

The Negative Test Analyst may be used to identify changes in the pressure that fall outside of acceptable bounds. Some of the plurality of algorithms described here may be used to calculate those acceptable bounds in real time based on one or more of the described parameters. The parameters include the measured pressures themselves and user-specified configuration parameters described below. A flow diagram that describes an embodiment of the algorithm that is utilized within a Negative Test Analyst may be found in FIG. 2. It is envisioned that additional decision points may be added to that algorithm. Based on work done on previous pressure testing algorithms, those decision points may include, but are not limited to, a.) failing a test (or not allowing a test to pass) when the slope of a time-pressure curve that has been fit to the measured points falls outside of upper and lower slope-boundaries that are calculated in real-time or are static values, b.) failing a test (or not allowing a test to pass) when the second derivative of a time-pressure curve that has been fit to the measured points falls outside of upper and lower second-derivative-boundaries that are calculated in real-time or are static values and c.) failing a test if measured pressure points are not below a maximum value (e.g., similar to the requirement in 30 CFR 250.737 (b) to bleed back to zero a low-pressure test that has an initial pressure that exceeds 500 psi).

Figure 2:
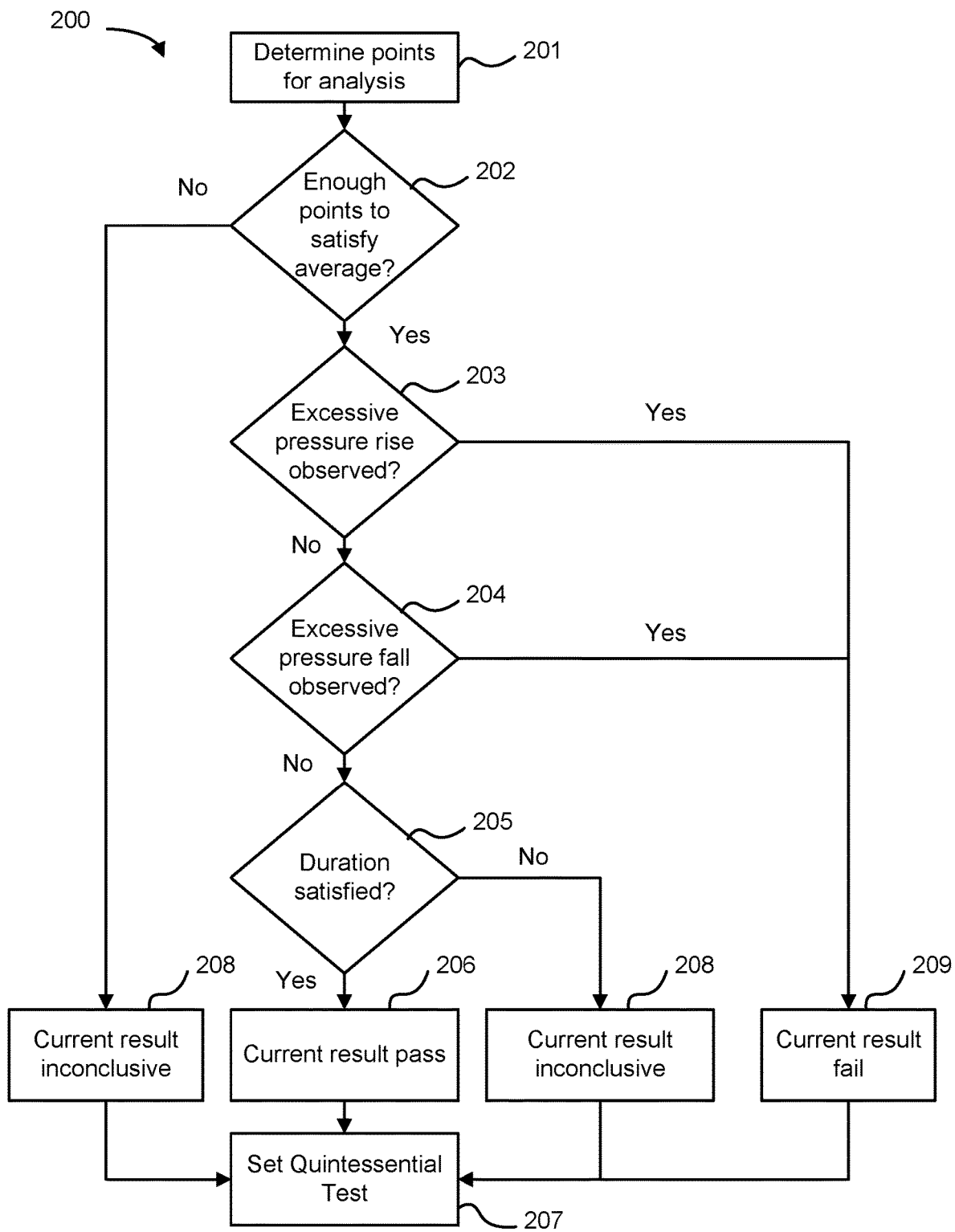
FIG. 2 is a flow chart for a process disclosed herein.
Figure 3:
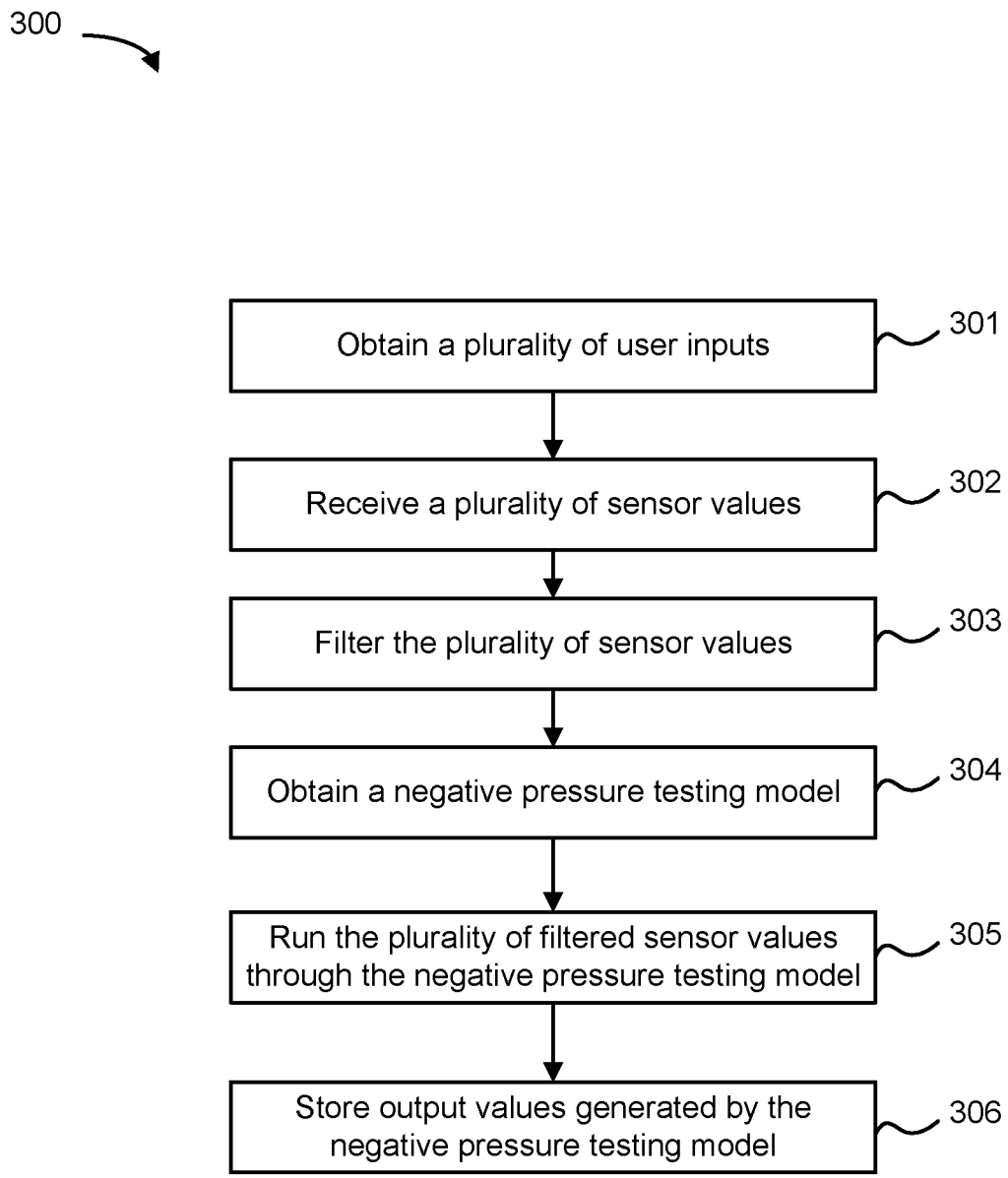
FIG. 3 is a flow of processes for selection and utilization of data according to certain embodiments.

FIG. 2 shows a flow process for an embodiment of the techniques taught herein, including a version of the high-level algorithm implemented by the Negative Test Analyst each time a new pressure point is measured. Some versions are like previous analysts that have already been integrated into commercial products such as GreenLight™ and field deployed, the results of the Negative Test Analyst can be shown on the user interface using a traffic light system; green for passed, red for failed and yellow for inconclusive. Other visual cues are understandable to a user as well, including patterns, images, words, or haptic/tactile response. The algorithms for calculating excessive pressure rise and excessive pressure fall can be user-configurable. Certain implementations are described throughout this disclosure. FIG. 2 shows in flow form a process undertaken according to the present disclosure. First, the system through integrated or external software process or the user at the user's option determines points to analyze 201. If there are enough points to satisfy an average determination 202, the larger process is undertaken. Pressure differences over time are observed. If an excessive pressure rise is observed 203, the report determines a fail 209. If an excessive pressure fall is observed 204, the report determines a failed test 209. Time elapses in the test until sufficient time has passed for the purposes of the test 205. Until that sufficient time, set by parameters guided by agency rule, law, customer preference, or otherwise, the test reports inconclusive 208. Upon sufficient time passing, the test reports a pass 206. This sets the quintessential test 207. The test can end or repeat for differing needs of the user. FIG. 3 shows a process under certain embodiments herein wherein the tests performed are enabled through obtaining inputs 102 of FIG. 1 from the user at step 301 and sensors 101 of FIG. 1 at step 302. The sensors values can be filtered 303 to obtain sensor values appropriate for conducting of tests, and the filter can include any technique for filtering 109 of FIG. 1, including mathematical manipulation or discrimination based on various factors (e.g., smoothing, rejection of outliers, and otherwise). A particular model 107 of FIG. 1 is obtained at step 304 and the values and inputs are tested 105 and 108 of FIG. 1 in that model at step 305. The outputs are stored 106 of FIG. 1 at step 306 for further use, direct interpretation by the user, or further manipulation.

In certain embodiments, the Negative Test Analyst may have several parameters which are user-configurable which include (but are not limited to) those described below.

Time, under the parameter Duration is utilized in the tests. The time that may be acquired before a Test may be considered passing. The various aspects of a Test may be considered within a time window of Duration. Some embodiments restrict the selection such that it is not possible for the Negative Test Analyst to pass a Test unless until a time period of Duration has been collected. Other embodiments employ a less strict test or have no similar consideration. The duration of a negative test is not specified in 30 CR 2510.721 (g). A user may set this duration to an appropriate value based on past testing experience, e.g., 10 minutes, 20 minutes, 30 minutes or some other appropriate value. The values can be determined based on user preference, the devices under test, laws and/or regulatory requirements, or otherwise.

Pressure Rise, under the parameter LargestAcceptableRise is utilized in the test. The largest pressure rise that may not hinder a Test from passing. The largest acceptable rise of a negative test may be not specified in 30 CFR 250.721 (g). A user may set this parameter to an appropriate value based on past testing experience, e.g., to 10 psi, 15 psi, 20 psi or some other appropriate value. For a test to pass, pressures measured during a time span of Duration may not rise above an upper limit that is calculated in real-time based on the specification of the RiseUnderstanding parameter. The value of LargestAcceptableRise may be set independently of the value of LargestAcceptableFall.

Various other parameters are discussed below.

Figure 4:
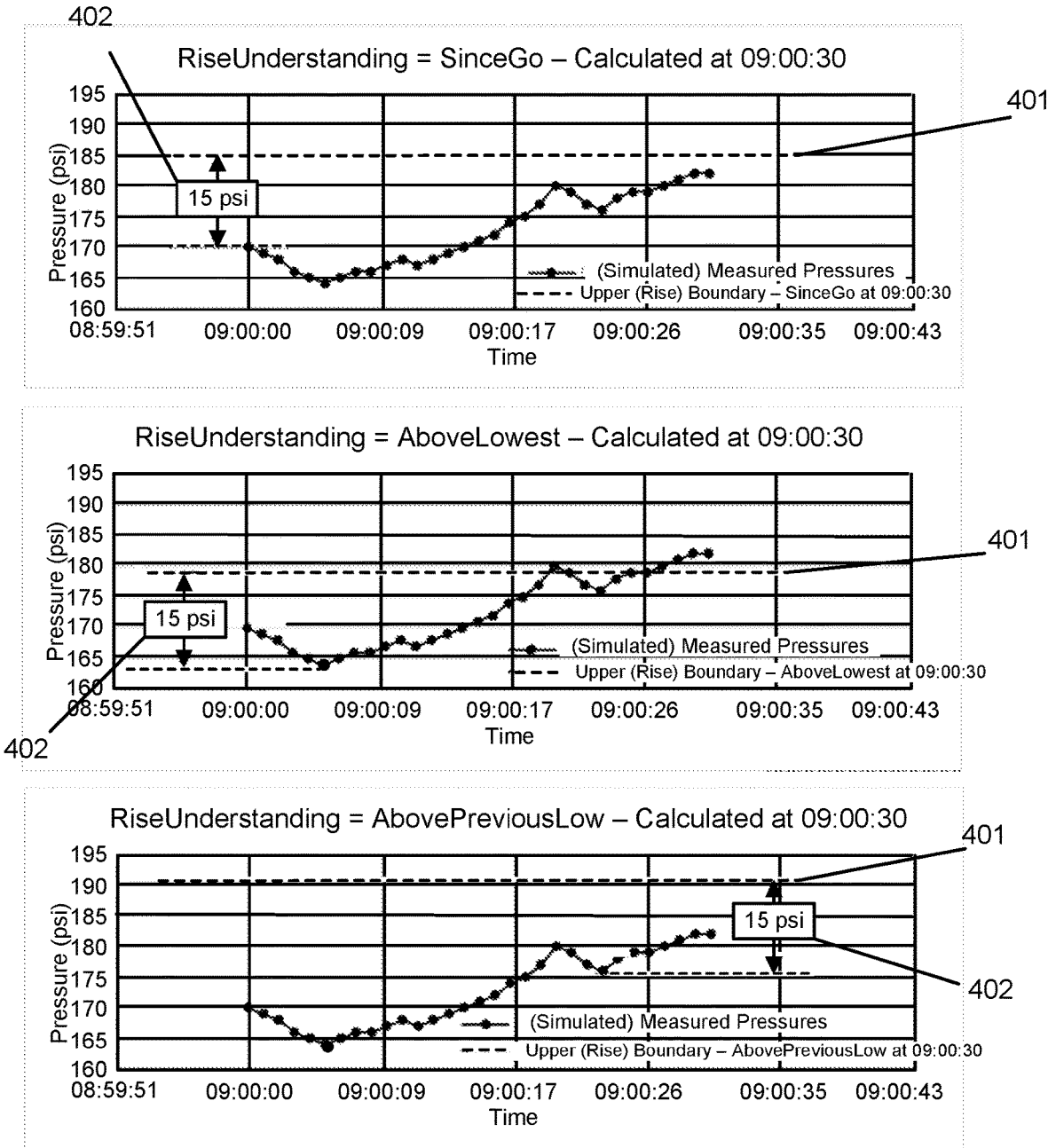
FIG. 4 is a set of three charts showing data analyzing pressure rise with data utilized according to the test processes, with parameters set to SinceGo, AboveLowest, and AbovePreviousLow.

RiseUnderstanding—A variable that is used to dictate how pressure rise should be calculated. The way to interpret pressure rise encountered during a negative pressure test is not specified in 30 CFR 250.721 (g). Although we may anticipate using the 'SinceGo' method in the field, the other two methods—AboveLowest and AbovePreviousLow—provide different ways of assessing pressure rise and are included in the algorithm so that the Negative Test Analyst may be adequately responsive to different ways of using the Analyst in the field. Currently, some of the plurality of the algorithms include several methods of calculating pressure rise. FIG. 4 demonstrates in some embodiments examples of the impact of the RiseUnderstanding parameter. Each of the three images shows the upper pressure boundary 401 utilized by the Negative Test Analyst at 09:00:30 for a.) the same population of (simulated) measured pressures and b.) the same value of the LargestAcceptableRise parameter 402 that is equal to 15 psi. In spite of these similarities, the upper boundary utilized by the Negative Test Analyst when the last pressure point, the one at 09:00:30, is measured will depend on the value of the RiseUnderstanding parameter. In the top image, RiseUnderstanding is set to SinceGo and the upper boundary for the point measured at 09:00:30 is 170 psi+15 psi=185 psi, 170 psi being the first measured pressure value. In the middle image RiseUnderstanding is set to AboveLowest and the upper boundary for the point measured at 09:00:30 is 164 psi+15 psi=179 psi, 164 psi being the lowest measured pressure anywhere in the population. In the bottom image, RiseUnderstanding is set to AbovePreviousLow and the upper boundary for the point measured at 09:00:30 is 176 psi+15 psi=191 psi, 176 psi being the previous low found when 'marching' backwards in time from 09:00:30.

In FIG. 4, SinceGo parameter indicated in the top image can be understood to mean the pressure rise is calculated relative to the pressure measured at the beginning of the evaluation time period specified by the Duration configuration parameter.

In FIG. 4, AboveLowest parameter indicated in the middle image can be understood to mean pressure rise is calculated relative to the lowest pressure measured anywhere within the time period specified by the aforementioned Duration configuration parameter.

In FIG. 4, AbovePreviousLow parameter indicated in the bottom image can be understood to mean pressure rise is calculated relative to the most recently measured low pressure value in the time period specified by the aforementioned Duration configuration parameter.

Figure 5:
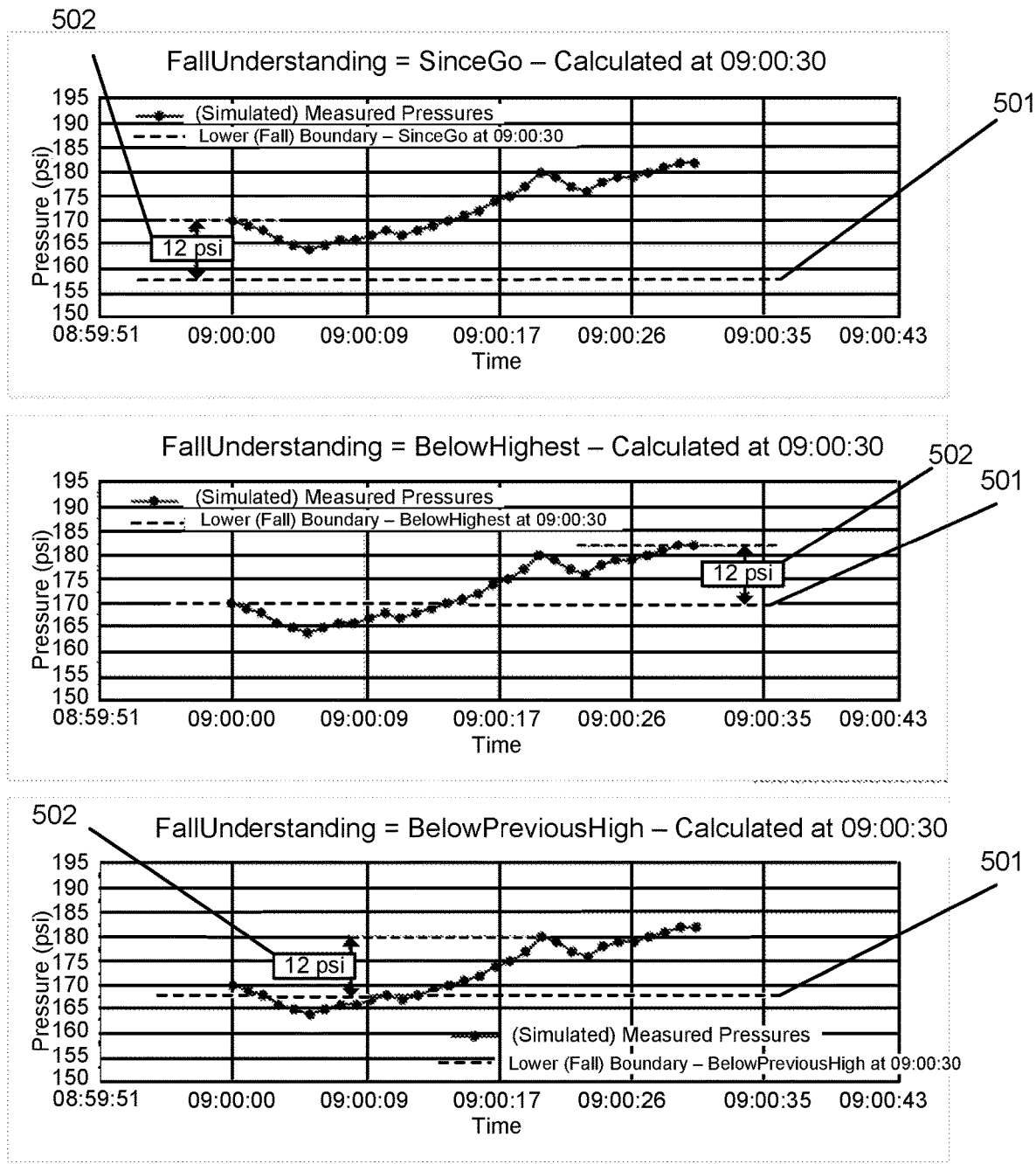
FIG. 5 is a set of three charts showing data analyzing pressure drow with data utilized according to the test processes, with parameters set to SinceGo, BelowHighest, and BelowPreviousHigh.

FIG. 5 shows various exemplary analysis under a pressure fall parameter. Differing impacts of the FallUnderstanding parameter are shown. Each of the three images shows the lower pressure boundary utilized by the Negative Test Analyst 501 at 09:00:30 for a.) the same population of (simulated) measured pressures and b.) the same value of the LargestAcceptableFall parameter 502 that is equal to 12 psi. In spite of these similarities, the lower boundary utilized by the Negative Test Analyst when the last pressure point, indicated at 09:00:30, is measured will depend on the value of the FallUnderstanding parameter. In the top image, FallUnderstanding is set to SinceGo and the lower boundary for the point measured at 09:00:30 is 170 psi−12 psi=158 psi, 170 psi being the first measured pressure value. In the middle image FallUnderstanding is set to BelowHighest and the lower boundary for the point measured at 09:00:30 is 182 psi−12 psi=170 psi, 182 psi being the lowest measured pressure anywhere in the population. In the bottom image, FallUnderstanding is set to BelowPreviousHigh and the lower boundary for the point measured at 09:00:30 is 180 psi−12 psi=168 psi, 180 psi being the previous high found when 'marching' backwards in time from 09:00:30.

In implementations of the tests shown in FIG. 5, LargestAcceptableFall can be understood to be the largest pressure fall that will not hinder a Test from passing. The largest acceptable fall of a negative test is not specified in 30 CFR 250.721 (g). A user may set this parameter to an appropriate value based on past testing experience, e.g., to 10 psi, 15 psi, 20 psi or some other appropriate value. For a test to pass, pressures measured during a time span of Duration may not fall below a lower limit that is calculated in real-time based on the specification of the FallUnderstanding parameter. The value of LargestAcceptableFall may be set independently of the value of LargestAcceptableRise.

In FIG. 5, FallUnderstanding can be understood as the FallUnderstanding configuration parameter, which is the mirror image of the RiseUnderstanding configuration parameter that is described above. FallUnderstanding is a variable that may be used to dictate how pressure fall should be calculated. The way to interpret pressure rise encountered during a negative pressure test is not specified in 30 CFR 250.721 (g). Although we may anticipate using the 'SinceGo' method in the field, the other two methods—BelowHighest and BelowPreviousHigh—provide different ways of assessing pressure fall and are included in the algorithm so that the Negative Test Analyst may be adequately responsive to different ways of using the Analyst in the field. Currently, some of the plurality of the algorithms include several methods of calculating pressure fall including the following (FIG. 3):

In FIG. 5, SinceGo can be understood to mean the pressure fall which is calculated relative to pressure measured at the beginning of the evaluation time period specified by the aforementioned Duration configuration parameter.

In FIG. 5, BelowHighest can be understood to mean the parameter wherein pressure rise is calculated relative to the highest pressure measured anywhere within the time period specified by the aforementioned Duration configuration parameter.

In FIG. 5, BelowPreviousHigh can be understood to mean pressure rise which is calculated relative to the most recently measured high pressure value in the time period specified by the aforementioned Duration configuration parameter.

Noise, under the parameter AvgApproach is utilized. The pressure points that are measured during a pressure test may have some variation due to noise, e.g., electronic noise in the electronic transducer used during testing. To address noise, the Negative Test Analyst may be able to perform its assessment based on average data according to three different methods. Other methods, including a standard average (e.g., $P_{avg} = \Sigma P_i/N$), have been envisioned and may be implemented. For the sake of clarity, we anticipate, in at least some cases, using no averaging (this is consistent with what we do with other Analysts). However, field experience has indicated that it is sometimes necessary to deal with noise and the averaging methods described here are straightforward ways of addressing noise if the need arises.

Various parameters manipulate the data incoming and outgoing for ease of use, understanding, accuracy and computer efficiencies. No averaging is performed in certain embodiments upon user selection or automated processes. In this case the negative test analyst's assessment is performed on the raw, as-measured, pressure points. Linear—Using this setting causes the negative test analyst to perform its assessment on pressure values that are calculated using a line that has been fit to the raw, as-measured, pressure points. SecondOrder—Similar to the Linear setting, this setting leads to the negative test analyst performing its assessment based on pressure values that are calculated based on a second order polynomial that has been fit to the raw, as-measured, pressure points. AvgPopulationSize—This parameter dictates how many points will be included in the Linear or SecondOrder averaging methods described above.

Figure 6:
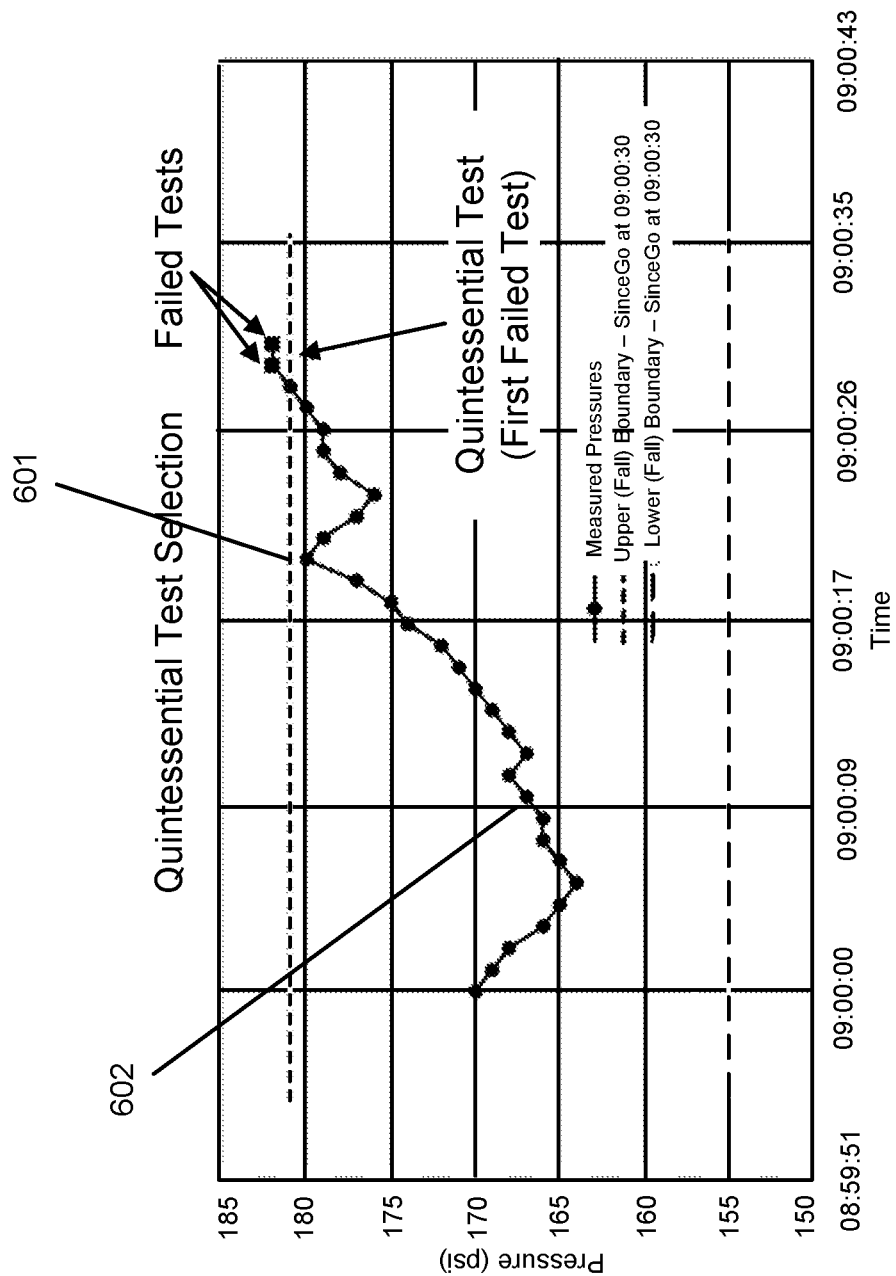
FIG. 6 is a Quintessential Test selection.

The test can be known as the Quintessential Test. The Negative Test Analyst associates a Test with each measured pressure point, in certain embodiments. In other embodiments, fewer than all pressure points are utilized, and in other embodiments mathematical modeling of predicted pressure points, averaged pressure points, smoothed date or other transformed data or predictions are used. In some embodiments, a Test includes the population of measured pressure points (which terminates at one specific measured pressure point), the parameters that were used by the Negative Test Analyst to analyze that population and the results of that analysis. For example, shown in FIG. 6 is a population of 31 pressure points 601, one point per second from 09:00:00 to 09:00:30. The Test associated with the specific measured pressure point at 09:00:09 602 includes 10 pressure points (from 09:00:00 to 09:00:09, inclusive), the values of the Analyst's parameters, e.g., a Duration=5 minutes, LargestAcceptableFall=11 psi, LargestAcceptableRise=15 psi, and the result associated with the Test at 09:00:09 which, in this case, would be "Inconclusive" (indicated by the black circle at 09:00:09 in FIG. 6). A consideration regarding a population of Tests is which Test to consider the representative Test for the entire population. That Test is referred to as the Quintessential Test (QT). It is the QT that is used when reporting the results of the Negative Test Analyst on a report for a regulatory body (e.g., the Bureau of Safety and Environmental Enforcement (BSEE)). The Negative Test Analyst may have three user-configurable parameters that are used by the algorithm that selects the QT, although more or fewer user-configurable parameters are contemplated.

Figure 7:
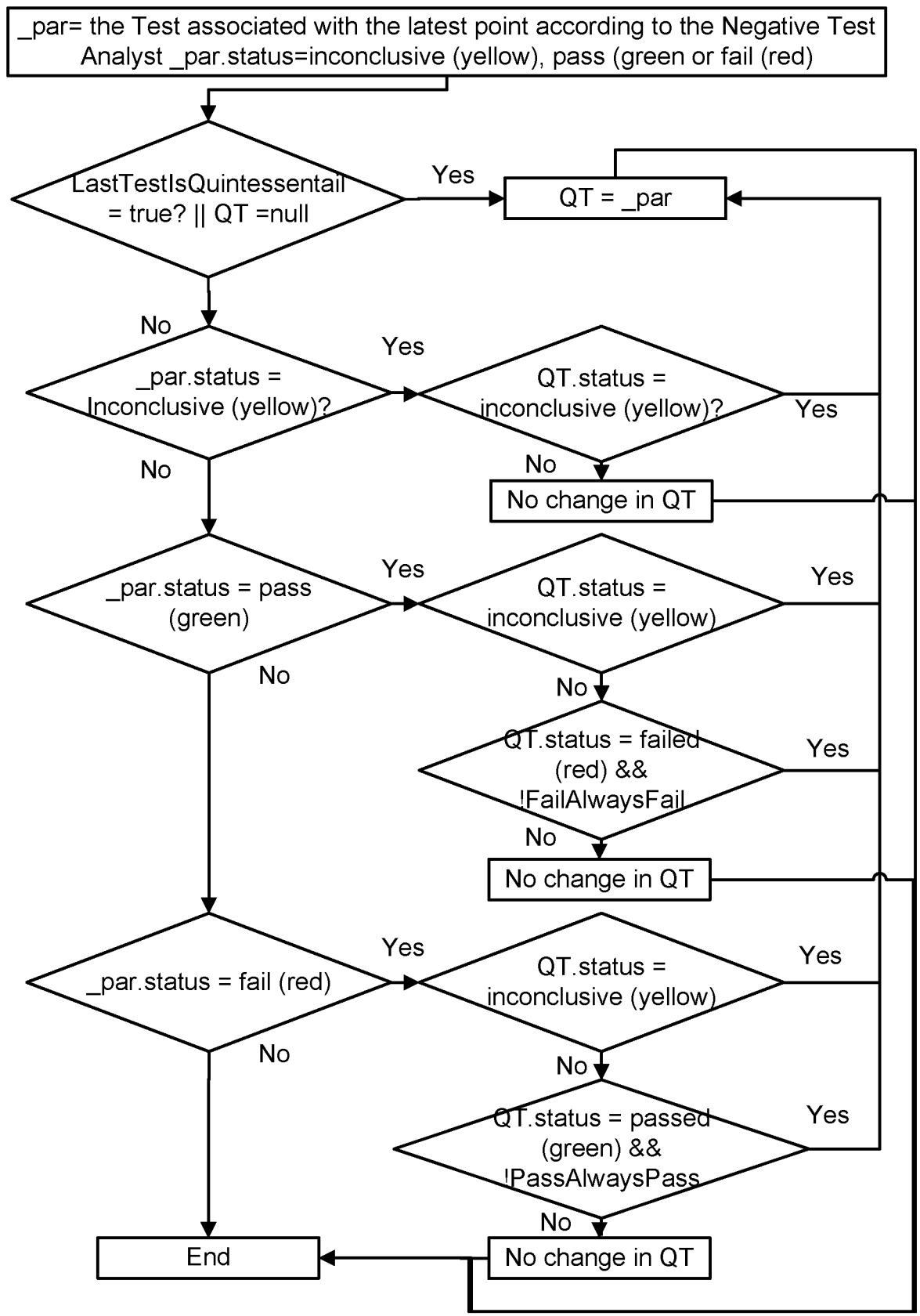
FIG. 7 is a flow process underlying the Quintessential Test selection of FIG. 6

In the analysis in FIG. 6, a Quintessential Test (QT) determination is shown. The same population of simulated measured pressure points that are shown in FIG. 4 and in FIG. 5 are shown as either circular dots or squares. The upper boundary and lower boundary of 181 psi and 155 psi are based on an evaluation of the population at 09:00:30 with RiseUnderstanding=SinceGo, FallUnderstanding=SinceGo, LargestAcceptableRise=11 psi and LargestAcceptableFall=15 psi. The 29 circular dots that are reported for times of 09:00:00 to 09:00:28, inclusive, indicate that the Negative Test Analyst reported an Inconclusive (which in a color display could be indicated in yellow) status for the Test associated with that pressure point. The two squares 603, at 09:00:29 and 09:00:30, indicate that the Tests associated with those points have a Failed (which could be indicated as coloring through a red) status. According to the algorithm shown in FIG. 7 (with LastTestIsQuintessential=false), the QT is updated every second from 09:00:00 to 09:00:29 (all but the last Test in that group has a status of Inconclusive) to point to the Test associated with the latest measured point. When the last point, at 09:00:30, is measured the QT is not updated as it has been 'latched' to the Test associated with the point at 09:00:29.

Certain parameters associated with a QuentessentialTest are discussed below, and each of the parameters are usable one or more with additional tests discussed herein.

LastTestIsQuintessential—If this Boolean parameter is set to true then the last Test, regardless of result (pass (green), fail (red) or inconclusive (yellow)), can be considered the QT. This behavior is described by the vertical line that is the furthest to the left in FIG. 7. If this parameter is set to false then selection of the QT is more complicated and depends on the status of the previous QT and the status of the newly assessed Test.

FailAlwaysFail—If this Boolean parameter is set to true then if a QT is ever specified that has a failing status then that QT cannot be superseded with a Test that has a status of either Inconclusive or Pass. In this case of once-failed-always-failed, the user would be forced to restart analyses completely to try and capture a passing test. Due to the seriousness of a negative test on an oil and gas well, we anticipate running the Negative Test Analyst with FailAlwaysFail=true.

PassAlwaysPass—This Boolean parameter is the mirror image of the FailAlwaysFail parameter. If PassAlwaysPass is set to true then if a QT is ever specified that has a passing status then that QT cannot be superseded with a Test that has a status of either Inconclusive or Fail. In this case of once-passed-always-passed, the user would be forced to restart analyses completely to try and capture a failing test. Due to the seriousness of a negative test on an oil and gas well, we anticipate running the Negative Test Analyst with PassAlwaysPass=false.

Figure 8A:
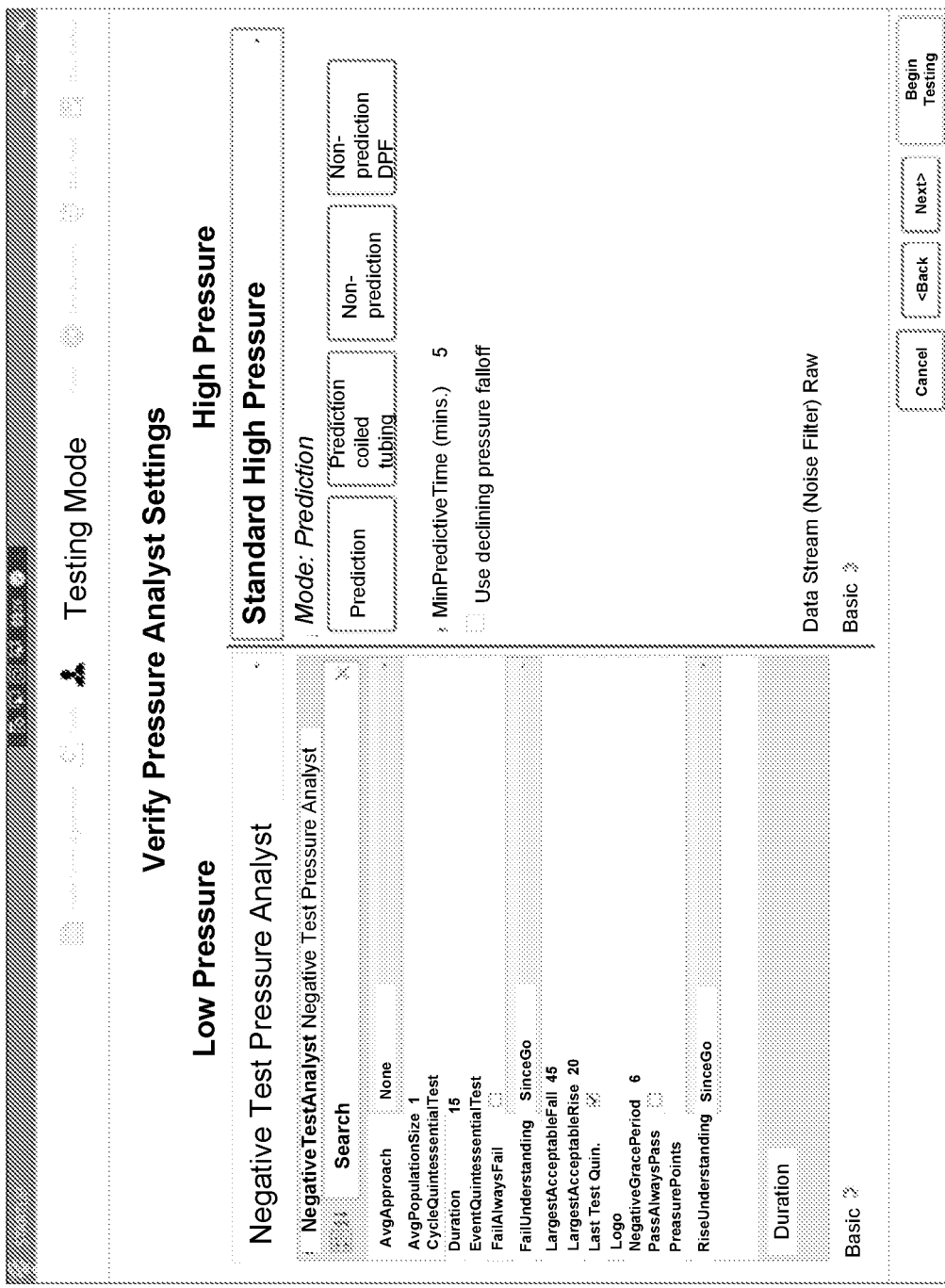
FIG. 8a and FIG. 8b is a selection of test and an output embodiment of a test according to certain of the selected test.
Figure 8B:
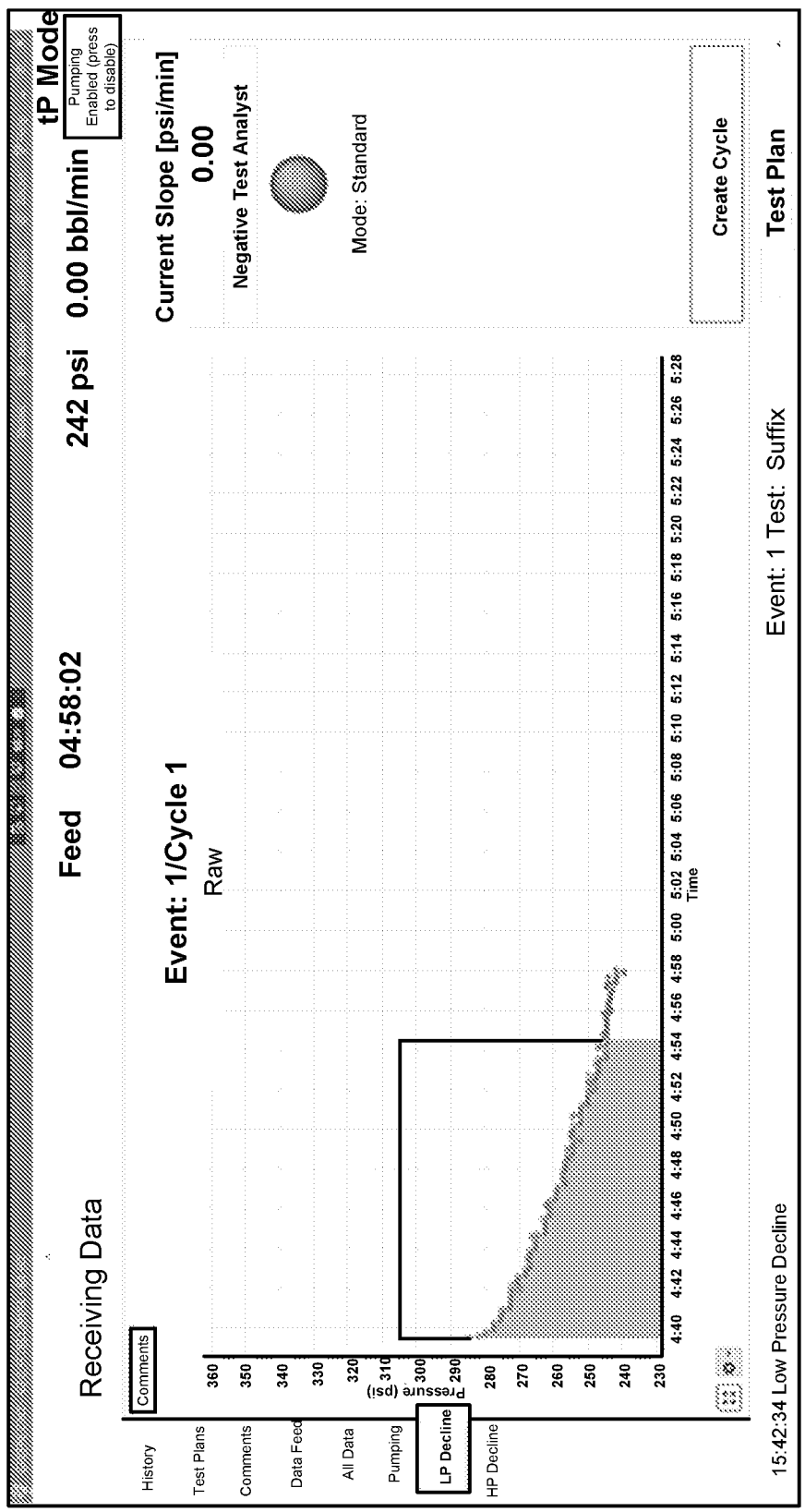
Figure 9B:
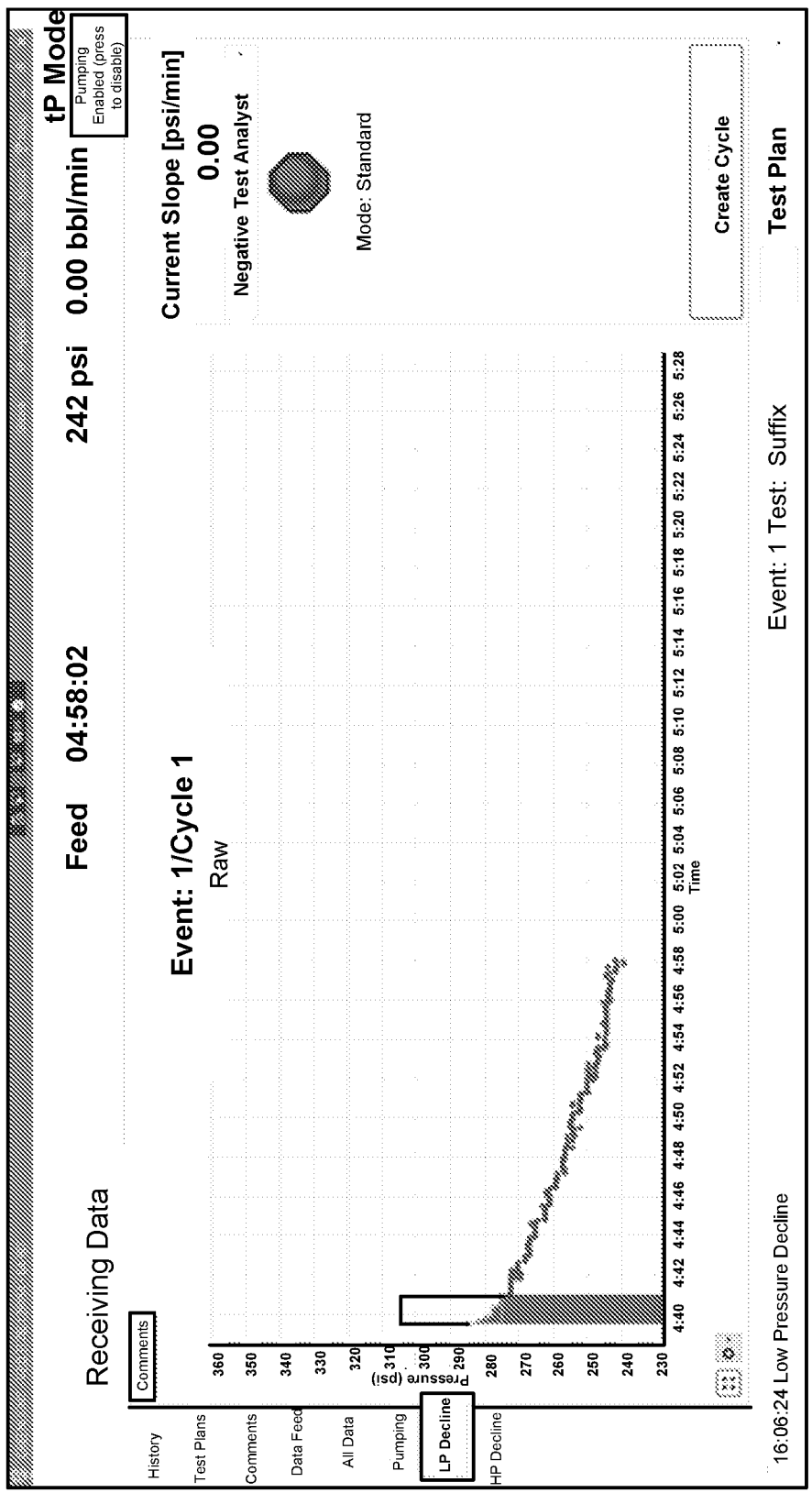
Figure 10A:
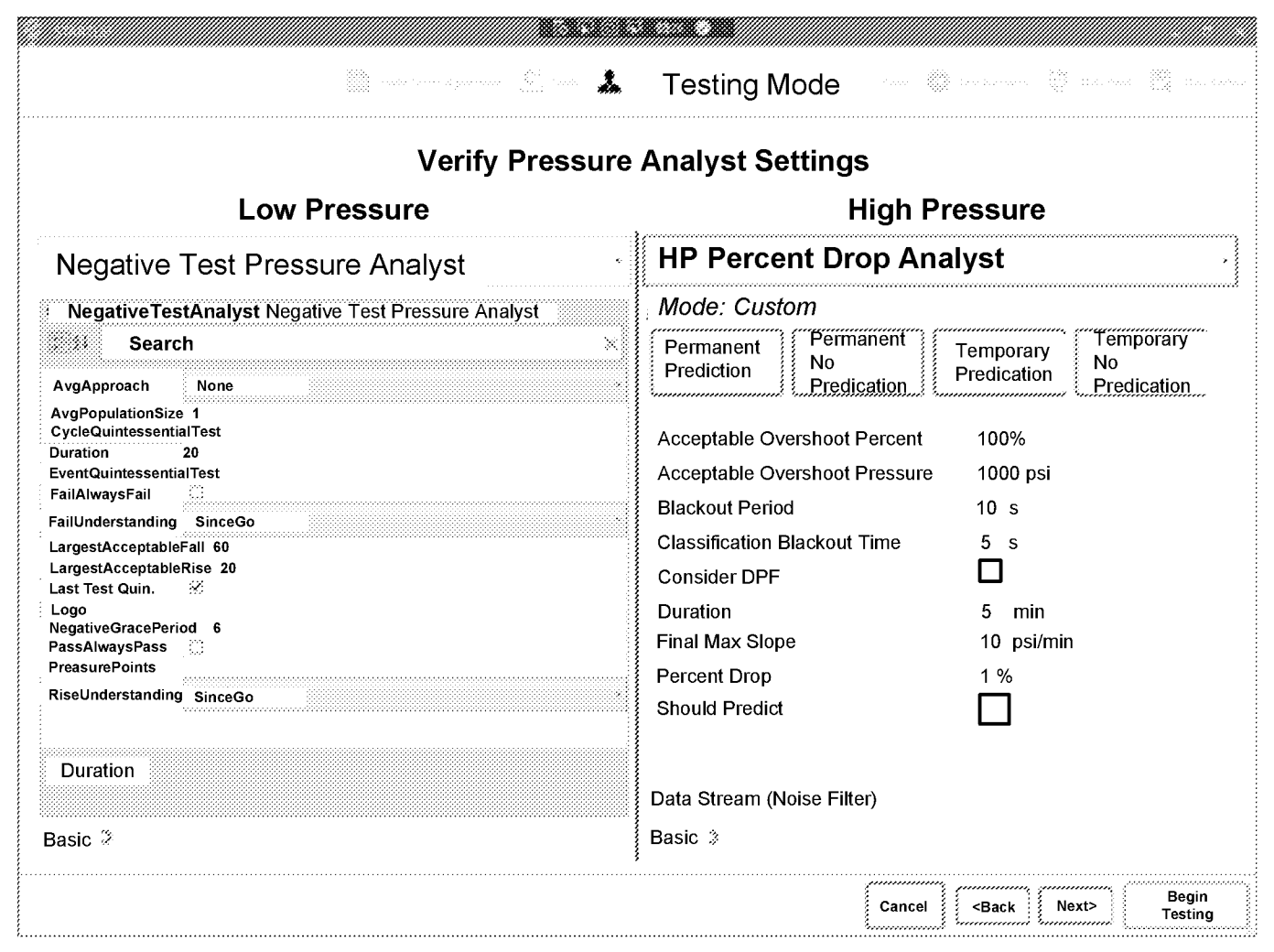
Figure 10B:
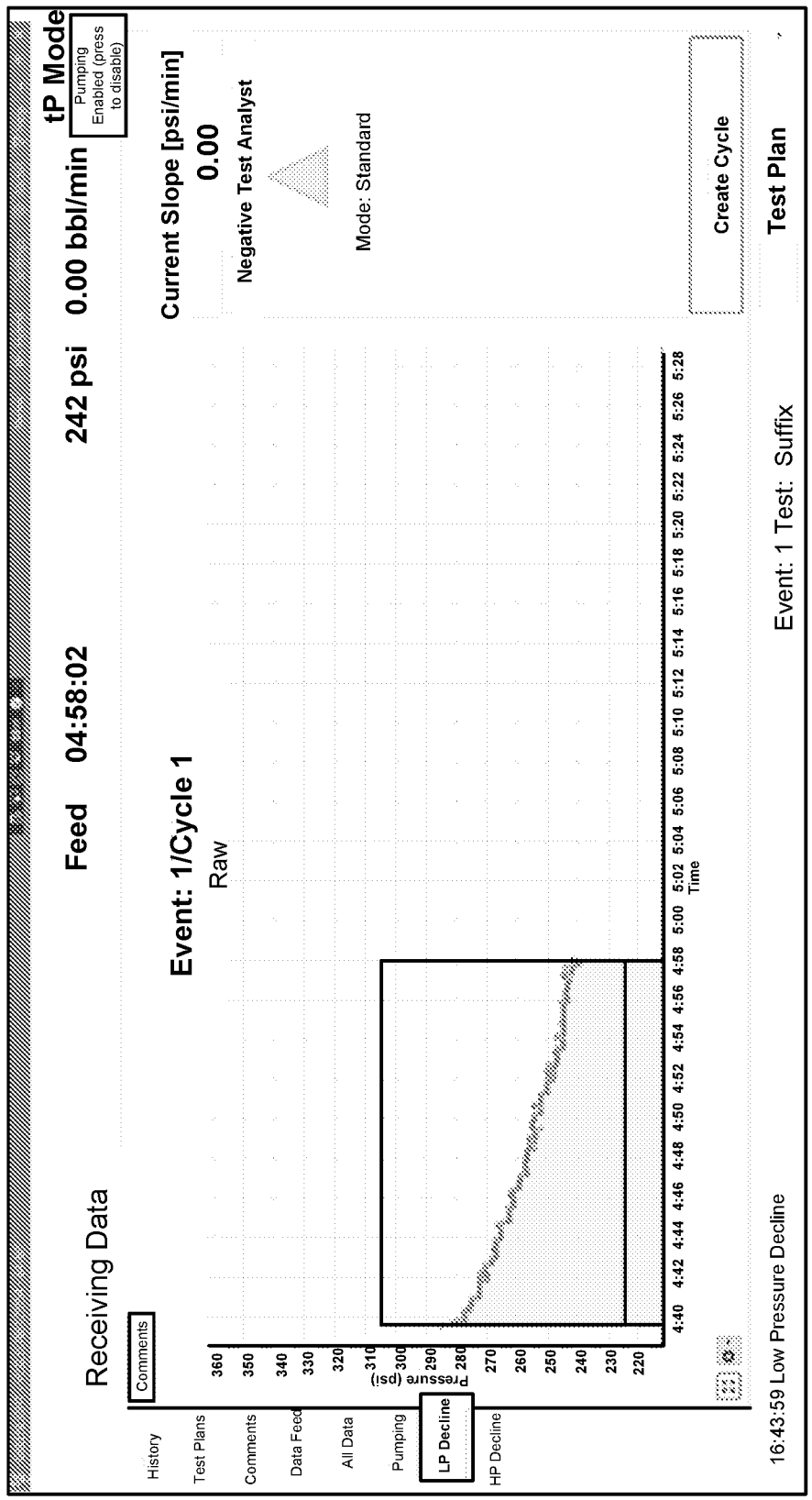
Figure 12:
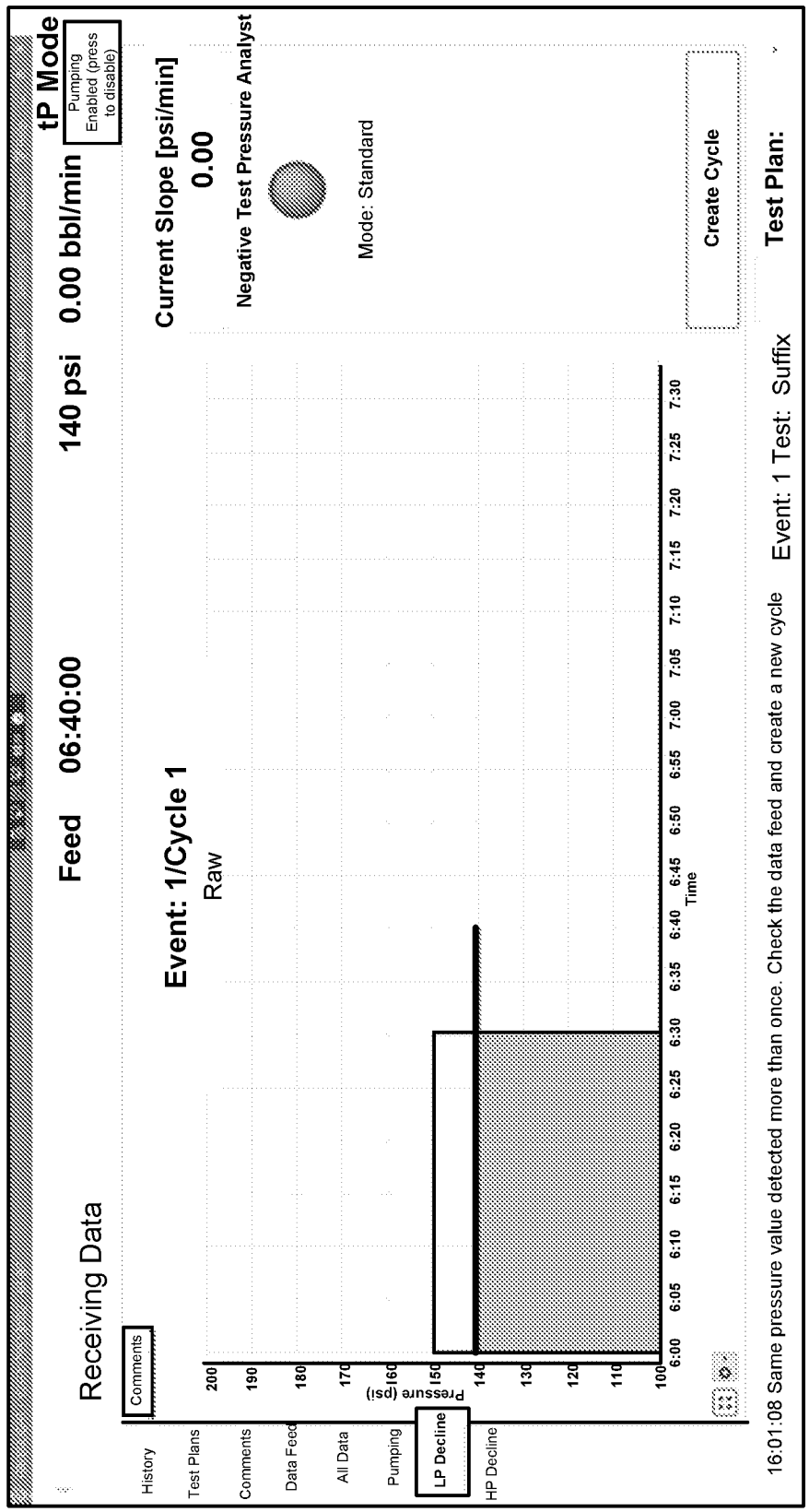
FIG. 12 shows output of non-varying data.
Figure 13A:
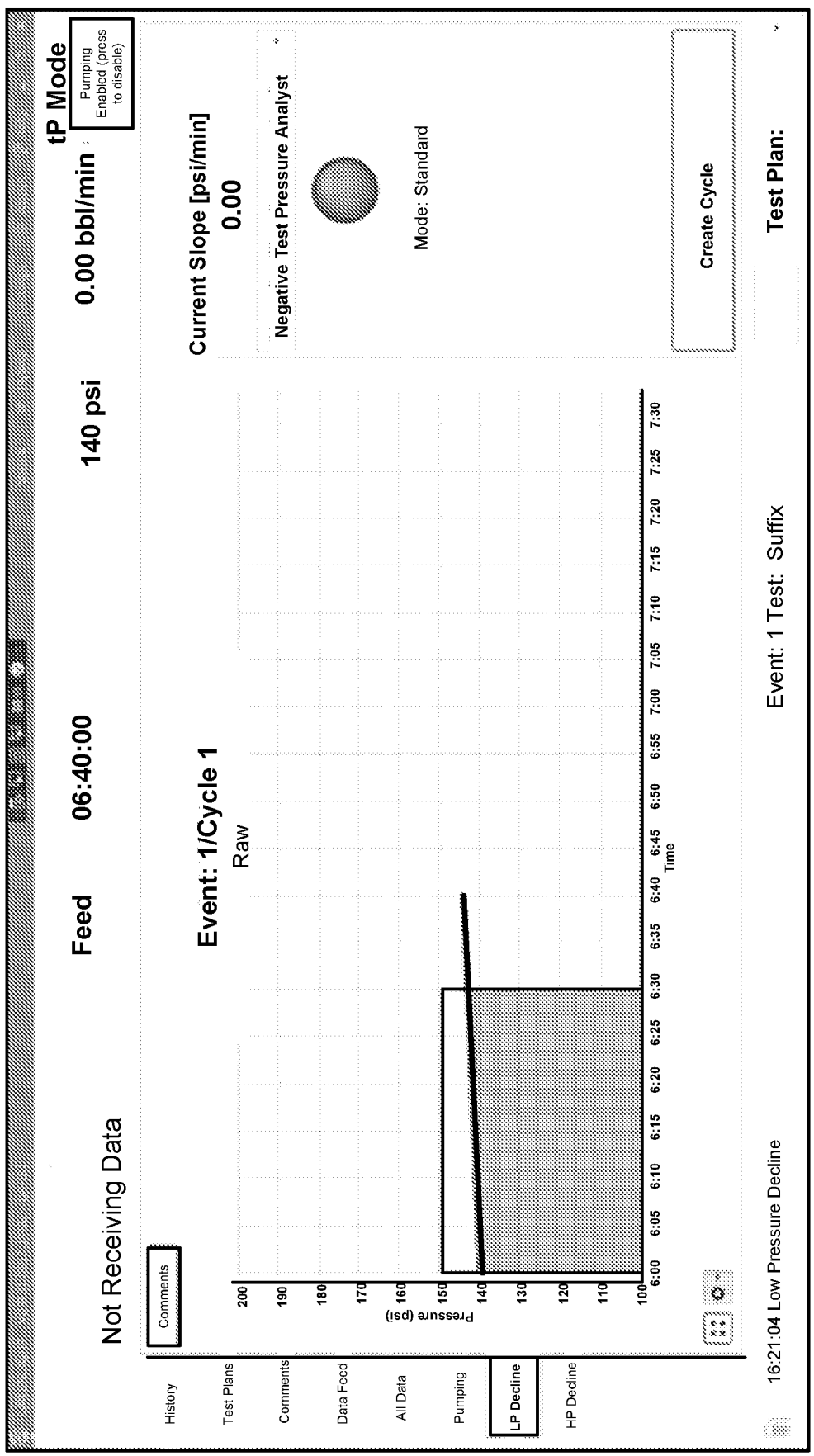
FIGS. 13a and 13b show output based on moderately linearly increasing data and moderately linearly decreasing data.
Figure 13B:
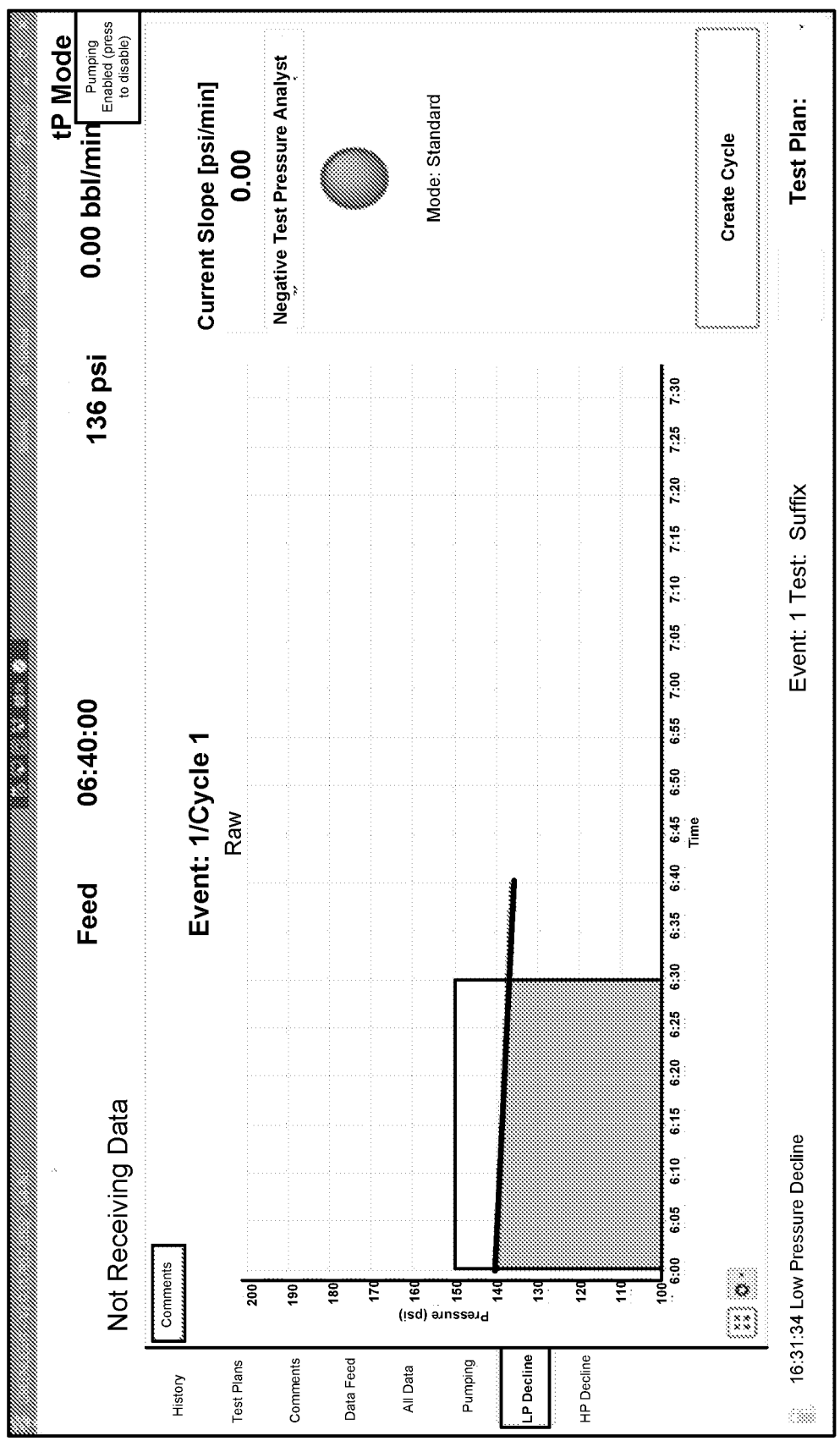
Figure 14A:
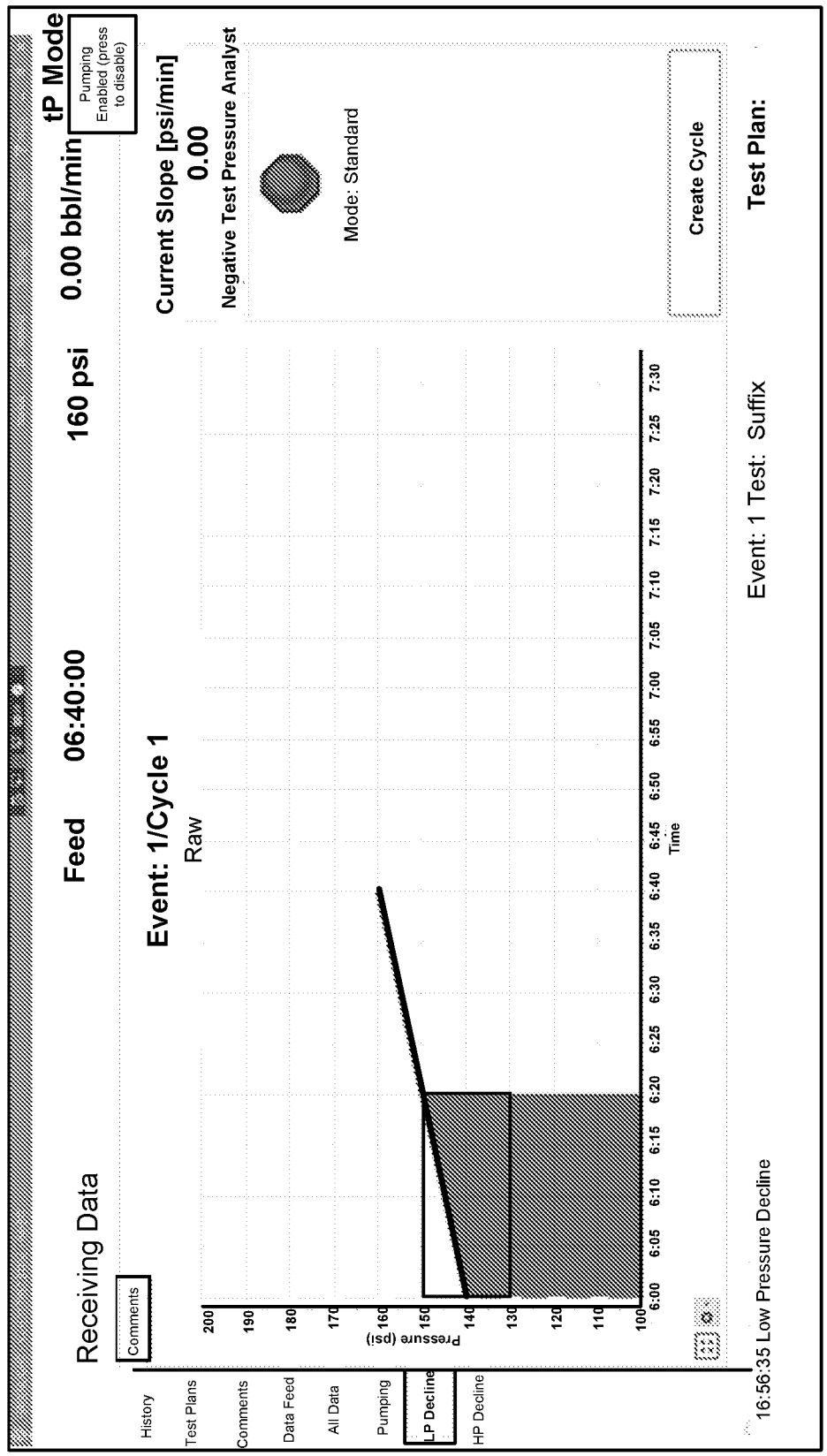
FIGS. 14a and 14b show output based on more severely linearly increasing data and more severely linearly decreasing data.
Figure 14B:
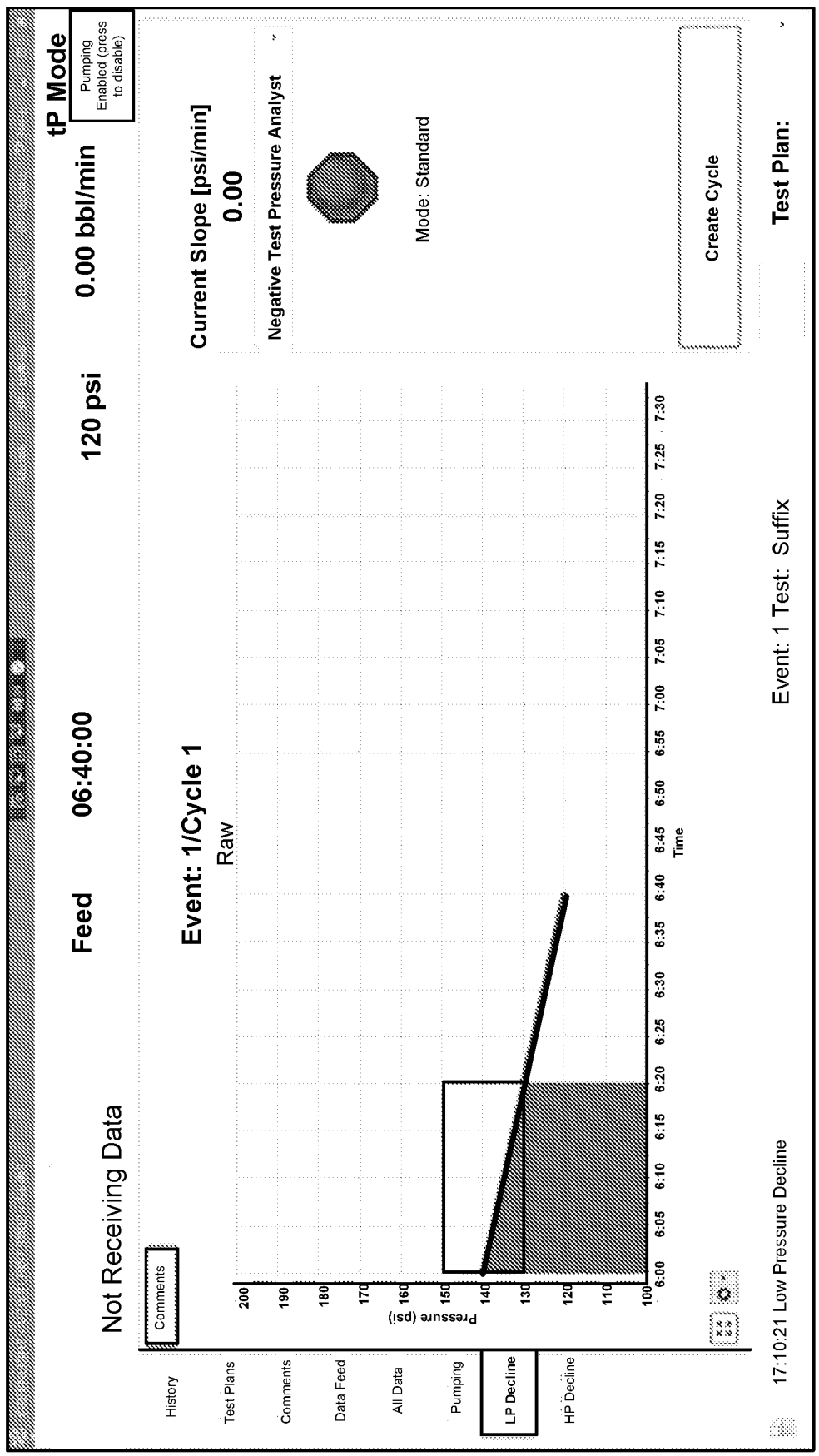
Figure 15:
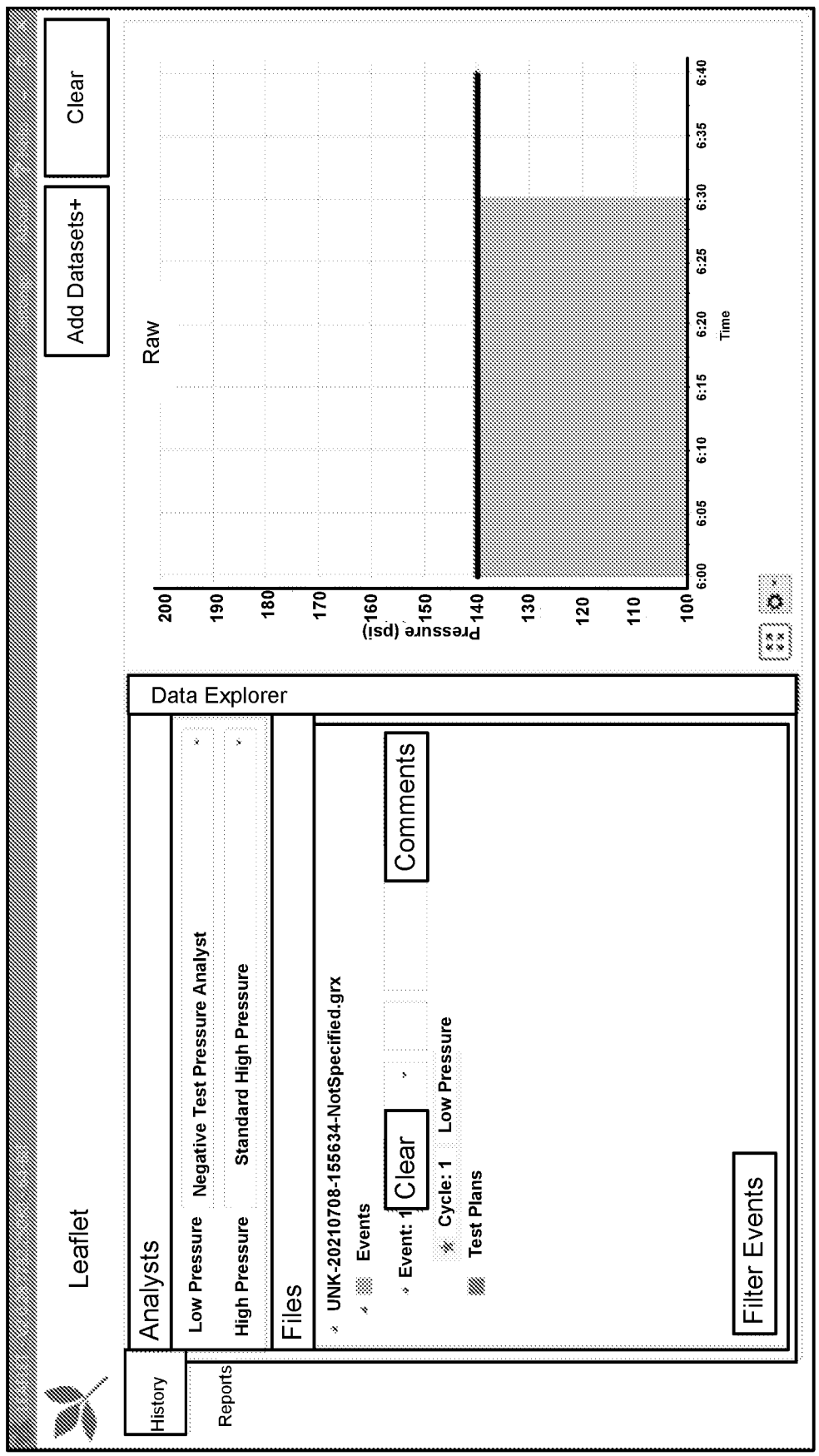
FIG. 15 shows a commercial embodiment of Leaflet™ utilizing in conjunction with the tests herein.

This disclosure includes documentation of the Negative Test Analyst's behavior when it was used to analyze different types of data. FIG. 8, FIG. 9 and FIG. 10 show the results of feeding field-acquired data to the Negative Test Analyst. That data was originally acquired during a low-pressure BOP test. FIG. 11 shows the configuration settings of the Negative Test Analyst that were used for the analyses that are reported in FIG. 12, FIG. 13 and FIG. 14. FIG. 12, FIG. 13 and FIG. 14 show the results of feeding simulated data that was created in Excel to the Negative Test Analyst. FIG. 15 shows that Leaflet is able to report the results from the Negative Test Analyst.

FIG. 8 shows a.) the configuration settings of the Negative Test Analyst above and b.) the user interface of GreenLight as it is reporting a 'pass' from the Negative Test Analyst that is using those settings. The data used for this demonstration was originally collected by GreenLight during a low pressure BOP test collected in the field (Hecate has long had the ability to 'replay' field-collected data). The measured pressures within the box did not fall more than 45 psi (see top image) below the first measured pressure within the box and thus the Test passed. Because the FallUnderstanding parameter is set to SinceGo (see top image), the measured 'fall' is calculated relative to the measured pressure at the beginning of the box.

FIG. 9 shows the same data shown in FIG. 5, which was passed through the Negative Test Analyst. Hereere the Negative Test Analyst was configured so that a passing test could only fall 10 psi fall relative to the pressure measured SinceGo. The first such fall occurs shortly after the data analysis starts. This screenshot representation shows results and output at the same feed time (i.e., 04:58:02) as the screenshot representation in FIG. 5.

FIG. 10 shows output utilizing the same data shown in FIG. 5, which was passed through the Negative Test Analyst. Here the Negative Test Analyst was configured so that a passing test a.) could fall 60 psi relative to the pressure measured SinceGo (possibly unrealistic in a real-world application but satisfactory to show the behavior of the Negative Test Analyst) and b.) needed to have a duration of 20 minutes. Because the calculated pressure drop never exceeds 60 psi, a failing Test is never reported. Further, because 20 minutes of data have yet to be collected in this screenshot, only inconclusive test results are reported. This screenshot was taken at the same feed time (i.e., 04:58:02) as the screenshots in FIG. 5 and in FIG. 6.

FIG. 11 shows the configuration settings of the Negative Test Analyst that were used for the analyses that are reported in FIG. 12, FIG. 13 and FIG. 14.

FIG. 1 Negative Test Analyst results for simulated data that did not vary with time. The simulated pressure profile was a constant 140 psi for 40 minutes. As expected based on the configuration parameters in FIG. 11, the Negative Test Analyst passed this test once 30 minutes of data was acquired and continued to pass the test for the subsequent 10 minutes.

FIG. 2 examples of the Negative Test Analyst reporting 'passing' results for simulated data. The data in the upper image has a 'slight' linear increase in pressure as a function of time defined by (P(t)=140 psi+(0.1 psi/min)*t) which leads to a 4.0 psi rise in 40 minutes. The data in the lower image is the mirror image of the data in the upper image with a profile defined by (P(t)=140 psi−(0.1 psi/min)*t) which leads to a 4.0 psi pressure drop in 40 minutes. As expected based on the configuration parameters in FIG. 11, for both of these data sets the Negative Test Analyst a.) reported an Inconclusive (yellow, represented in a color display of a similar image on the right side of the user display) until a 'Pass' was reported once 30 minutes of data was acquired and b.) continued to report a 'Pass' for both of them for the subsequent 10 minutes. The +/−10 psi horizontal boundaries of the gray boundary box that is shown in both images (which indicates the Quintessential Test) is based on the initial pressure inside of that box because RiseUnderstanding=SinceGo and FallUnderstanding=SinceGo. Subsequent gray boundary boxes would be shifted-up relative to the box drawn in the upper image and would be shifted down relative to the box drawn in the lower image due to the different initial pressures in those boxes. The red X at the top-left of the image is an indication that the play-back of data was completed and that GreenLight was no longer receiving 'live' data from its data source.

FIG. 3 shows examples of the Negative Test Analyst reporting 'failing' results for simulated data. Similar to the data shown in FIG. 13, the data shown here in the upper image, defined by P(t)=140 psi+(0.5 psi/min)*t, is the mirror image of the data shown in the lower image, defined by P(t)=140 psi−(0.5 psi/min)*t. As expected, the more aggressive slopes (0.5 vs 0.1 and −0.5 vs. −0.1) than those encountered in FIG. 13 lead the Negative Test Analyst to report a 'failed' result (red) for a Test as soon as a boundary is crossed (i.e., after 20 minutes have elapsed with 'Inconclusive (yellow) results being reported. Specifically, in this embodiment the Negative Test Analyst does not wait for a boundary to be crossed and for the Duration to be satisfied before reporting a failure. As in FIG. 13, the gray boundary boxes shown here indicate the Quintessential Test. The settings shown in FIG. 11 were used for these analyses.

FIG. 4 displays an output of Leaflet™, the reporting tool of the GreenLight™ Suite, which is able to show the results of the Negative Test Analyst which have been stored to the proprietary *.grx file, in a manner similar to Leaflet™ capabilities for other Analysts.

FIG. 16 is a diagram that illustrates an exemplary computing system 1000 by which embodiments of the present technique may be implemented. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the figures are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

What is claimed is:

1. A non-transitive computer readable medium storing a pressure analysis program for analysis of pressure data that, when executed by a processor, causes an information processing apparatus connected to an image display screen, to perform operations comprising:
   receiving at least one of a plurality of inputs from a user;
   receiving a plurality of pressure values from a sensor;
   filtering at least a subset of the plurality of pressure values;
   selecting one of a plurality of negative pressure testing models;
   running the filtered subset of pressure values through the selected negative pressure testing model; and
   storing the values generated by the negative pressure testing model.

2. The medium of claim 1, wherein the plurality of inputs from the user include at least one of a test duration, a pressure rise parameter, an algorithm to calculate pressure rise, a pressure fall parameter, an algorithm to calculate pressure fall, or a noise algorithm.

3. The medium of claim 1, wherein the plurality of pressure values from the sensor includes pressure values acquired during a blowout preventor test.

4. The medium of claim 1, wherein the filtering includes mathematical manipulation or discrimination based on at least one of smoothing or rejection of outliers.

5. The medium of claim 1, wherein the operations further comprise:
   failing the values generated by the negative pressure testing model when a slope of a time-pressure curve falls outside of upper and lower slope-boundaries or the values generated are static.

6. The medium of claim 1, wherein the operations further comprise:
   failing the values generated by the negative pressure testing model when a second derivative of a time-pressure curve falls outside of upper and lower second-derivative-boundaries.

7. The medium of claim 1, wherein the operations further comprise:
   failing the values generated by the negative pressure testing model when the values are not below a maximum value.

8. The medium of claim 1, wherein the operations further comprise:
   reporting the values generated by the negative pressure testing model as inconclusive if a time requirement has not been satisfied.

9. The medium of claim 1, wherein the operations further comprise:
   passing the values generated by the negative pressure testing model if a time requirement has been satisfied and the values have not satisfied a failure requirement.

10. The medium of claim 1, wherein the operations further comprise steps for selecting one of the plurality of negative pressure testing models.

11. A pressure data analysis method, comprising:
    receiving, by a computer system, at least one of a plurality of inputs from a user;
    receiving, by the computer system, a plurality of pressure values from a sensor;
    filtering, by the computer system, at least a subset of the plurality of pressure values;
    selecting, by the computer system, one of a plurality of negative pressure testing models;
    running, by the computer system, the filtered subset of pressure values through the selected negative pressure testing model; and
    storing, by the computer system, the values generated by the negative pressure testing model.

12. The method of claim 11, wherein the plurality of inputs from the user include at least one of a test duration, a pressure rise parameter, an algorithm to calculate pressure rise, a pressure fall parameter, an algorithm to calculate pressure fall, or a noise algorithm.

13. The method of claim 11, wherein the plurality of pressure values from the sensor includes pressure values acquired during a blowout preventor test.

14. The method of claim 11, wherein the filtering includes mathematical manipulation or discrimination based on at least one of smoothing or rejection of outliers.

15. The method of claim 11, further comprising:
    failing the values generated by the negative pressure testing model when a slope of a time-pressure curve falls outside of upper and lower slope-boundaries or the values generated are static.

16. The method of claim 11, further comprising:
    failing the values generated by the negative pressure testing model when a second derivative of a time-pressure curve falls outside of upper and lower second-derivative-boundaries.

17. The method of claim 11, further comprising:
    failing the values generated by the negative pressure testing model when the values are not below a maximum value.

18. The method of claim 11, further comprising:
    reporting the values generated by the negative pressure testing model as inconclusive if a time requirement has not been satisfied.

19. The method of claim 11, further comprising:
    passing the values generated by the negative pressure testing model if a time requirement has been satisfied and the values have not satisfied a failure requirement.

20. The method of claim 11, further comprising steps for selecting one of the plurality of negative pressure testing models.

* * * * *